United States Patent
Kobayashi et al.

(10) Patent No.: US 12,044,900 B2
(45) Date of Patent: Jul. 23, 2024

(54) PROJECTION TYPE VIDEO DISPLAY DEVICE

(71) Applicant: Maxell, Ltd., Kyoto (JP)

(72) Inventors: Shuhei Kobayashi, Kyoto (JP); Takuya Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 168 days.

(21) Appl. No.: 17/617,930

(22) PCT Filed: Jul. 9, 2019

(86) PCT No.: PCT/JP2019/027132
§ 371 (c)(1),
(2) Date: Dec. 10, 2021

(87) PCT Pub. No.: WO2021/005711
PCT Pub. Date: Jan. 14, 2021

(65) Prior Publication Data
US 2022/0308312 A1 Sep. 29, 2022

(51) Int. Cl.
*G02B 7/14* (2021.01)
*G02B 7/08* (2021.01)
(Continued)

(52) U.S. Cl.
CPC ............. *G02B 7/14* (2013.01); *G02B 7/08* (2013.01); *H04N 9/3147* (2013.01);
(Continued)

(58) Field of Classification Search
CPC .......... G02B 7/14; G02B 7/08; H04N 9/3147; H04N 9/3179; H04N 23/55; H04N 23/67;
(Continued)

(56) References Cited

U.S. PATENT DOCUMENTS

2005/0078203 A1 4/2005 Akutsu
2009/0201431 A1 8/2009 Izumida
(Continued)

FOREIGN PATENT DOCUMENTS

JP 2000-241874 A 9/2000
JP 2006-99115 A 4/2006
(Continued)

OTHER PUBLICATIONS

International Search Report and Written Opinion mailed on Aug. 27, 2019, received for PCT Application PCT/JP2019/02713, Filed on Jul. 9, 2019, 9 pages including English Translation.

*Primary Examiner* — Ahmed A Berhan
(74) *Attorney, Agent, or Firm* — XSENSUS LLP

(57) ABSTRACT

An object of the present invention is to provide a projection type image display apparatus in which an imaging lens can be replaced according to a focal length of a projection lens. In order to achieve the above object, a projection type image display apparatus includes: a light source; a lighting optical system configured to guide light from the light source to a display element; a projection lens mounting portion in which a projection lens configured to project the light transmitting through or being reflected by the display element is mountable, and that is configured to allow one replaceable projection lens of a plurality of replaceable projection lenses to be selectively mounted in the projection type image display apparatus; and an imaging lens mounting portion configured to allow one imaging lens of a plurality of replaceable imaging lenses to be selectively mounted in the projection type image display apparatus.

21 Claims, 26 Drawing Sheets

(51) Int. Cl.
   *H04N 9/31*     (2006.01)
   *H04N 23/55*    (2023.01)
   *H04N 23/67*    (2023.01)

(52) U.S. Cl.
   CPC .......... *H04N 9/3179* (2013.01); *H04N 23/55* (2023.01); *H04N 23/67* (2023.01)

(58) Field of Classification Search
   CPC ...... H04N 9/317; H04N 9/3194; G03B 21/12; G03B 21/142; G03B 21/145
   See application file for complete search history.

(56) References Cited

U.S. PATENT DOCUMENTS

| | | | |
|---|---|---|---|
| 2012/0218527 A1* | 8/2012 | Hatakeyama | G03B 21/54 353/101 |
| 2013/0113975 A1* | 5/2013 | Gabris | G03B 17/54 353/121 |
| 2017/0208307 A1 | 7/2017 | Ichieda et al. | |
| 2017/0339382 A1 | 11/2017 | Furui | |

FOREIGN PATENT DOCUMENTS

| | | | |
|---|---|---|---|
| JP | 2009-219102 A | | 9/2009 |
| JP | 5381416 B2 | * | 1/2014 |
| JP | 2017-129839 A | | 7/2017 |
| JP | 2017-173488 A | | 9/2017 |
| JP | 2017173488 A | * | 9/2017 |
| JP | 2017-208677 A | | 11/2017 |
| JP | 2018-85553 A | | 5/2018 |

* cited by examiner

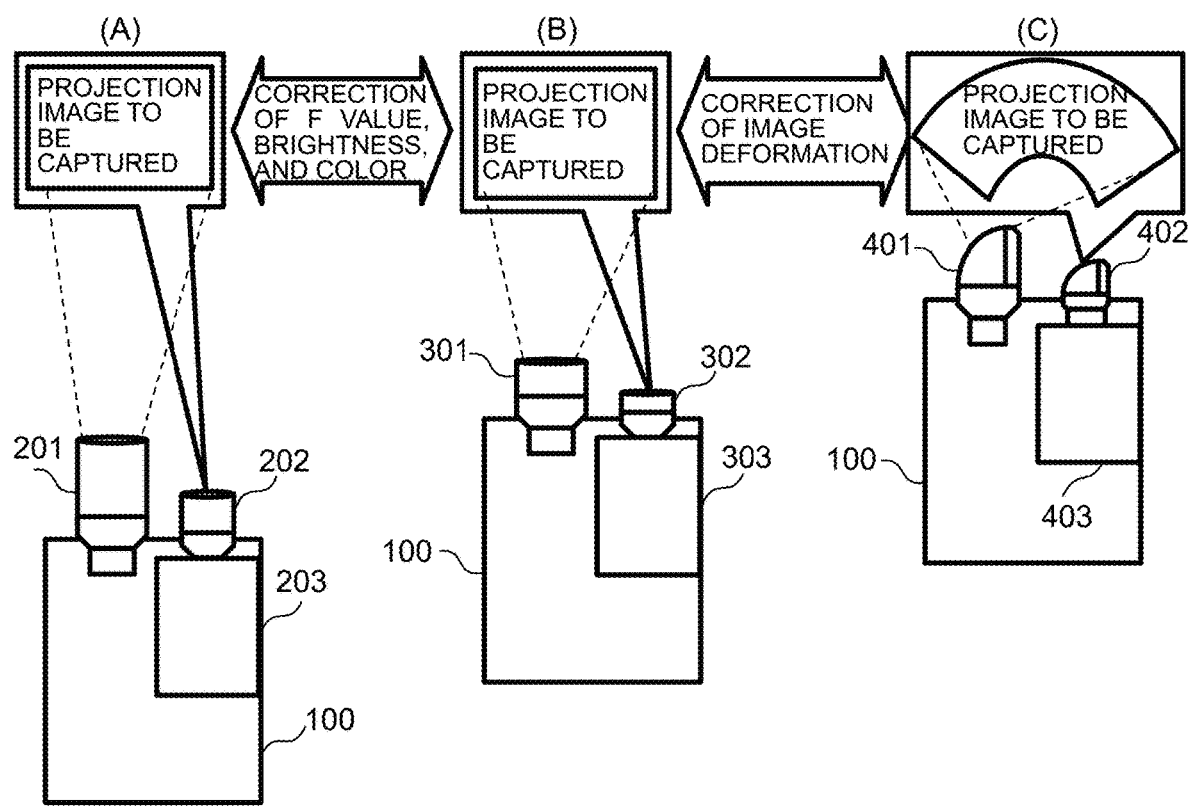

FIG. 7

| PROJECTION LENS / IMAGING LENS | ULTRA-SHORT FOCAL LENGTH PROJECTION LENS | MIDDLE FOCAL LENGTH PROJECTION LENS | LONG FOCAL LENGTH PROJECTION LENS |
|---|---|---|---|
| IMAGING LENS FOR ULTRA-SHORT FOCAL LENGTH LENS | [A] OPERATION: YES◎ WARNING: NO | [B] OPERATION: NO× WARNING: YES | [C] OPERATION: NO× WARNING: YES |
| IMAGING LENS FOR MIDDLE FOCAL LENGTH LENS | [D] OPERATION: NO× WARNING: YES | [E] OPERATION: YES◎ WARNING: NO | [F] OPERATION: YES○ WARNING: YES |
| IMAGING LENS FOR LONG FOCAL LENGTH LENS | [G] OPERATION: NO× WARNING: YES | [H] OPERATION: NO× WARNING: YES | [I] OPERATION: YES◎ WARNING: NO |

PROJECTION TYPE VIDEO DISPLAY DEVICE

CROSS-REFERENCE TO RELATED APPLICATION

The present application is based on PCT filing PCT/JP2019/027132, filed Jul. 9, 2019, the entire contents of which is incorporated herein by reference.

TECHNICAL FIELD

The present invention relates to a projection type image display apparatus having an imaging function.

BACKGROUND ART

Patent Document 1 is a background technique of a projection type image display apparatus having an imaging function. Patent Document 1 discloses that the adjustment of zooming to a screen frame and the adjustment of a trapezoidal distortion are automatically performed, in addition to disclosing that an image of a test pattern on a screen projected from a projector is captured by a monitor camera, image data is analyzed, and the focus of the projector is adjusted based on an analysis result.

CITATION LIST

Patent Document

Patent Document 1: JP 2000-241874 A

SUMMARY OF THE INVENTION

Problems to be Solved by the Invention

In Patent Document 1, adjustments other than the adjustment of the focus of the projector by a camera can be automatically performed. However, there are a long focal length type projector, a short focal length type projector, an ultra-short focal length type projector, and the like depending on a focal length of a projection lens, and it has not been considered that imaging lenses of cameras are replaced with optimal ones in projectors having different projection distances.

An object of the present invention is to provide a projection type image display apparatus in which an imaging lens can be replaced according to a focal length of a projection lens.

Solutions to Problems

According to one aspect of the present invention, in view of the background art and the object, there is provided a projection type image display apparatus including: a light source; a lighting optical system configured to guide light from the light source to a display element; a projection lens mounting portion in which a projection lens configured to project the light transmitting through or being reflected by the display element is mountable, and that is configured to allow one replaceable projection lens of a plurality of replaceable projection lenses to be selectively mounted in the projection type image display apparatus; and an imaging lens mounting portion configured to allow one imaging lens of a plurality of replaceable imaging lenses to be selectively mounted in the projection type image display apparatus.

Effects of the Invention

According to the present invention, the projection type image display apparatus can be provided in which the imaging lens can be replaced according to a focal length of the projection lens.

BRIEF DESCRIPTION OF THE DRAWINGS

FIG. 3 is a view describing a combination of a projection lens and an imaging lens of the projection type image display apparatus in the first embodiment.

FIG. 7 is a table describing combinations of projection lenses and imaging lenses in the first embodiment.

FIG. 11A illustrates setting at a wide angle side end in the second embodiment.

MODE FOR CARRYING OUT THE INVENTION

Hereinafter, embodiments of the present invention will be described with reference to the drawings.

First Embodiment

Figure 1A:
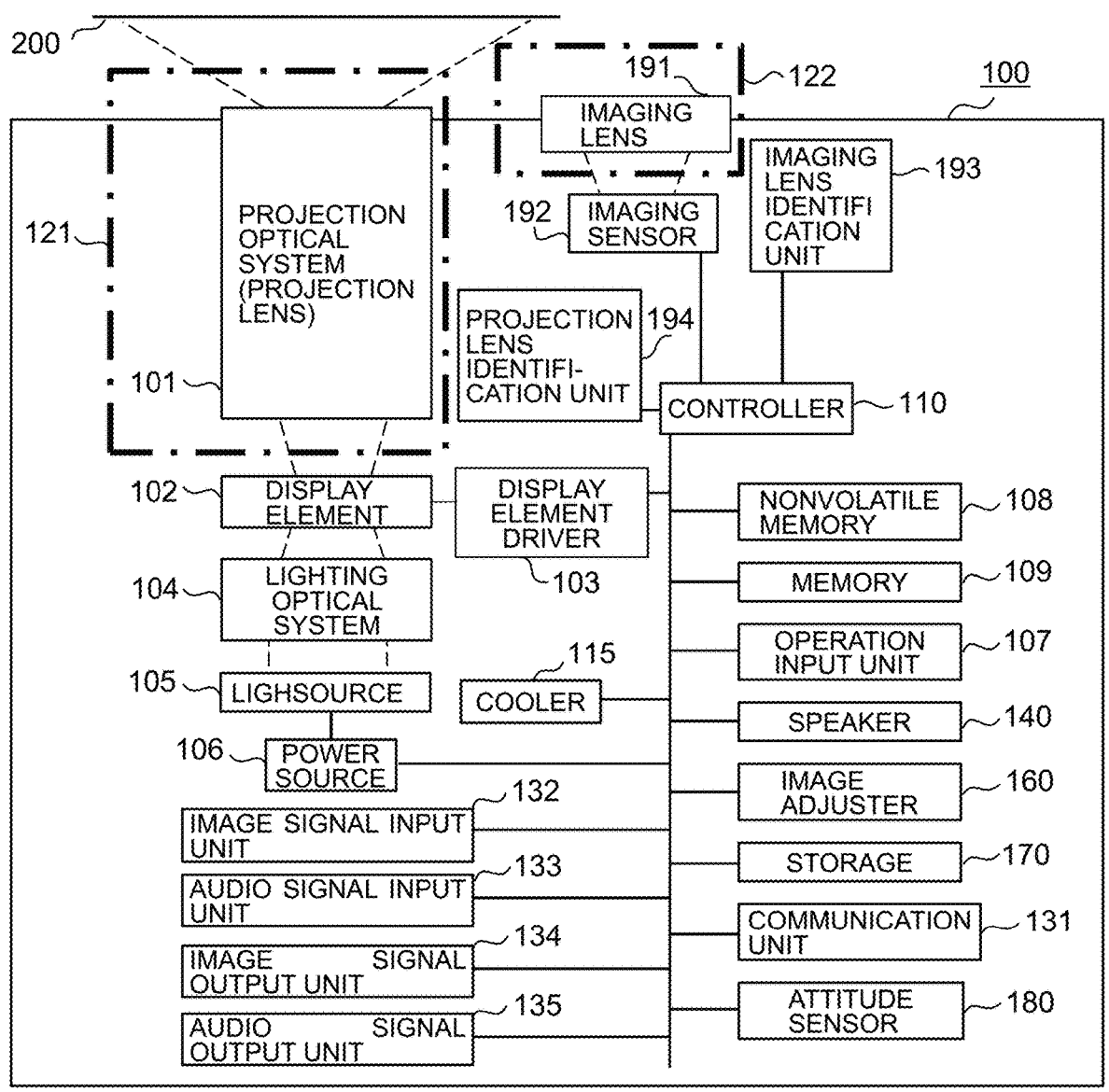
FIG. 1A is a configuration block diagram of a projection type image display apparatus in a first embodiment.

FIG. 1A is a configuration block diagram of a projection type image display apparatus in the present embodiment. In FIG. 1A, a projection type image display apparatus 100 includes a projection optical system (projection lens) 101, a display element 102, a display element driver 103, a lighting optical system 104, a light source 105, a power source 106, an operation input unit 107, a nonvolatile memory 108, a memory 109, and a controller 110. Further, the projection type image display apparatus 100 includes an imaging lens 191, an imaging sensor 192, an imaging lens identification unit 193, a projection lens identification unit 194, a cooler 115, a communication unit 131, an image signal input unit 132, an audio signal input unit 133, an image signal output unit 134, an audio signal output unit 135, a speaker 140, an image adjuster 160, a storage 170, an attitude sensor 180, and the like.

The light source 105 generates light for image projection, and a high-pressure mercury lamp, a xenon lamp, a LED light source, a laser light source, a combination thereof, and the like are used. The power source 106 converts an AC current to be input from the outside into a DC current to supply electric power to the light source 105. Further, the power source 106 supplies a DC current required for each of the other parts. The lighting optical system 104 concentrates the light generated by the light source 105, makes the light more uniform, and irradiates the display element 102 with the uniform light. The cooler 115 cools each part in a high temperature state such as the light source 105, the power source 106, or the display element 102 as necessary by an air cooling method or a liquid cooling method.

The display element 102 is an element that transmits or reflects the light from the lighting optical system 104 and modulates the light at that time to generate an image, and for example, a transmissive liquid crystal panel, a reflective liquid crystal panel, a digital micromirror device (DMD: registered trademark) panel, and the like are used. The display element driver 103 sends a drive signal corresponding to an image signal to the display element 102.

The projection optical system 101 is a magnification projection optical system that projects an image onto a display surface (screen) 200, and includes a lens and/or a mirror.

The image signal referred to by the display element driver 103 may be an input image signal input from the outside via the image signal input unit 132, may be an image signal obtained by the image adjustment of the input image signal performed by the image adjuster 160, or may refer to a signal in which an OSD image signal generated by the controller 110 using an image stored in the nonvolatile memory 108 or the storage 170 is overlapped on the image signal. An optical image that the display element 102 modulates light and generates according to a drive signal generated by the display element driver 103 with reference to the input image signal is projected onto the display surface 200 as a display image by the projection optical system 101.

The attitude sensor 180 is formed of a gravity sensor, a gyro sensor, or the like, and detects an installation attitude of the projection type image display apparatus 100. The controller 110 is capable of using information on the detected installation attitude. Specifically, the controller 110 may perform control to rotate a direction of an image to be displayed on the display element 102 using the information on the detected installation attitude, and to set automatically the direction as a display direction in which there is no discomfort with an installation state. In addition, the controller 110 may control the cooler 115 using the information on the detected installation attitude, and may perform control of a local intensity of cooling or the like, control of a change in cooling error detection threshold value, or the like such that cooling is suitable for the detected installation attitude.

The imaging lens 191 and the imaging sensor 192 form a so-called camera (imaging camera), and are also configured as a camera unit. The imaging sensor 192 may be a visible light sensor or an infrared sensor. The imaging sensor 192 may be appropriately selected according to application. A projection image or an image projection region including a projection image is captured using the camera formed of the imaging lens 191 and the imaging sensor 192. The camera may be configured as an infrared camera of which a main detection wavelength is infrared rays. In the case of being configured as the infrared camera, a pointer apparatus emits or reflects infrared rays to specify optically a pointing position, and the infrared camera captures an image of the display surface 200 including the emission or reflection of the infrared rays. The pointing position is detected based on the imaging result by a program to be executed by the controller 110. Control to change an image or GUI based on the detected pointing position can be performed to realize various interactive functions.

In addition, a person standing in front of the display surface 200 may be detected based on the captured image of the infrared camera by the program to be executed by the controller 110, and may be used for anti-glare control or the like to lower a light output of a projection image.

In addition, the camera including the imaging lens 191 and the imaging sensor 192 may be configured as a visible light camera. In this case, the camera may be used for the process of capturing an image to record or output an image of a periphery of the display surface 200 to the outside.

In addition, the camera including the imaging lens 191 and the imaging sensor 192 may capture a projection image, and may realize an autofocus function of the projection lens based on the captured image. The autofocus function will be described later.

In addition, the cameras each including the imaging lens 191 and the imaging sensor 192 may capture a plurality of projection images of a plurality of projection type image display apparatuses, and may perform automatic overlay control of the plurality of projection images based on the captured image. An automatic overlay function of the plurality of projection images will be described later.

The operation input unit 107 is an operation button or a light-receiving portion of a remote controller, and receives an operation signal from a user.

The speaker 140 is capable of outputting audio based on audio data input to the audio signal input unit 133. In addition, the speaker 140 may output an operation sound or an error warning sound that is built in.

The communication unit 131 communicates various data such as control data or content with an external apparatus, a network, a server, or the like via a wired or wireless interface (I/F).

The nonvolatile memory 108 stores various data to be used for a projector function. The memory 109 stores image data to be projected or apparatus control data. Image data to be used for the generation of a GUI image may be stored. The controller 110 controls operation of each part connected thereto.

The image adjuster 160 performs image processing on image data input by the image signal input unit 132. As the image processing, there are, for example, scaling processing for performing the enlargement, reduction, deformation, or the like of an image, bright adjustment processing for changing brightness, contrast adjustment processing for changing a contrast curve of an image, gamma adjustment processing for changing a gamma curve indicating gradation characteristics of an image, Retinex processing for decomposing an image into light components and changing a weighting of each component, and the like.

The storage 170 records videos, images, audio, various data, and the like. For example, videos, images, audio, various data, and the like may be recorded in advance at the time of product shipment, or various data such as video data, image data, audio data, and other data acquired from an external apparatus, an external server, or the like via the communication unit 131 may be recorded. The videos, the images, the various data, and the like recorded in the storage 170 may be output as projection images via the display element 102 and the projection optical system 101. The audio recorded in the storage 170 may be output as audio from the speaker 140.

The image signal input unit 132 receives an image signal from an external apparatus via the wired and/or wireless I/F. The audio signal input unit 133 receives an audio signal from an external apparatus via the wired and/or wireless I/F.

The image signal output unit 134 outputs an image signal to an external apparatus via the wired and/or wireless I/F. The image signal output unit 134 may have a function of outputting an image signal, which is input from a first external apparatus via the image signal input unit 132, to a second external apparatus as it is. The image signal output unit 134 may have a function of outputting an image signal, which is based on image data recorded in the storage 170, to an external apparatus. The image signal output unit 134 may have a function of outputting an image signal, which is based on an image captured by the camera, to an external apparatus.

The audio signal output unit 135 outputs an audio signal to an external apparatus via the wired and/or wireless I/F. The audio signal output unit 135 may have a function of outputting an audio signal, which is input from a first external apparatus via the audio signal input unit 133, to a second external apparatus as it is. The audio signal output unit 135 may have a function of outputting an audio signal, which is based on audio data recorded in the storage 170, to an external apparatus.

Here, in the drawing, as an example, the image signal input unit 132 and the audio signal input unit 133 are illustrated as separate components, but may form an integrated signal input I/F. In addition, similarly, the image signal output unit 134 and the audio signal output unit 135 may form an integrated signal output I/F. In addition, similarly, the image signal input unit 132, the audio signal input unit 133, the image signal output unit 134, and the audio signal output unit 135 may form an integrated signal input and output I/F. These integrated I/Fs may have a communication function of bidirectionally communicating a control signal. The communication function may be provided separately from the communication unit 131.

In addition, the projection type image display apparatus 100 of FIG. 1A is configured such that the imaging lens 191 in a portion illustrated by an alternate long and short dash line 122 is detachably attachable to the projection type image display apparatus 100. Here, the imaging lens identification unit 193 identifies the type and/or the performance of the imaging lens 191 mounted in the projection type image display apparatus 100. A configuration of the imaging lens identification unit 193 and a process of the imaging lens identification unit 193 when the imaging lens 191 is attached and detached will be described later.

In addition, the projection type image display apparatus 100 of FIG. 1A is configured such that the projection optical system (projection lens) 101 in a portion illustrated in an alternate long and short dash line 121 is detachably attachable to the projection type image display apparatus 100. Here, the projection lens identification unit 194 identifies the type and/or the performance of the projection lens 101 mounted in the projection type image display apparatus 100. A configuration of the projection lens identification unit 194 and a process of the projection lens identification unit 194 when the projection optical system (projection lens) 101 is attached and detached will be described later.

Figure 1B:
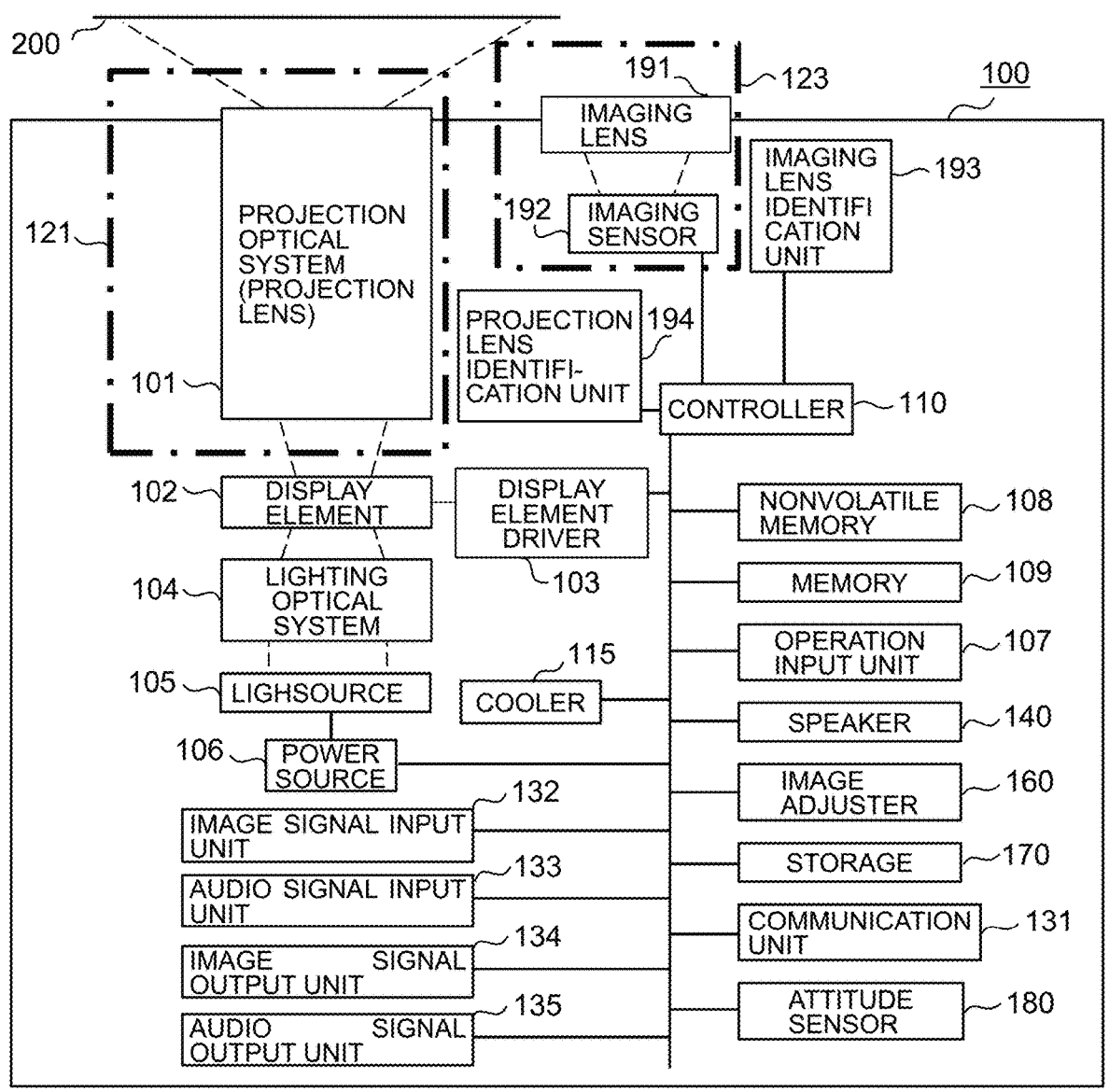
FIG. 1B is a configuration block diagram of another modification example of a projection type image display apparatus in the first embodiment.

Incidentally, the configuration may be as in FIG. 1B, as another modification example in which the imaging lens 191 is attached to and detached from the projection type image display apparatus 100 in a different manner. Namely, in FIG. 1B, a portion including the imaging lens 191 and the imaging sensor 192 illustrated by an alternate long and short dash line is a camera unit 123, and the camera unit 123 is configured to be detachably attachable to the projection type image display apparatus 100. In this case, the imaging lens identification unit 193 identifies the type and/or the performance of the camera unit mounted in the projection type image display apparatus 100. A configuration of the imaging lens identification unit 193 and a process of the imaging lens identification unit 193 when the camera unit is attached and detached will be described later. Incidentally, in FIG. 1B, since a configuration in which the projection optical system (projection lens) 101 is attached to and detached from the projection type image display apparatus 100 is the same as that in FIG. 1A, a description thereof will be omitted.

Figure 1C:
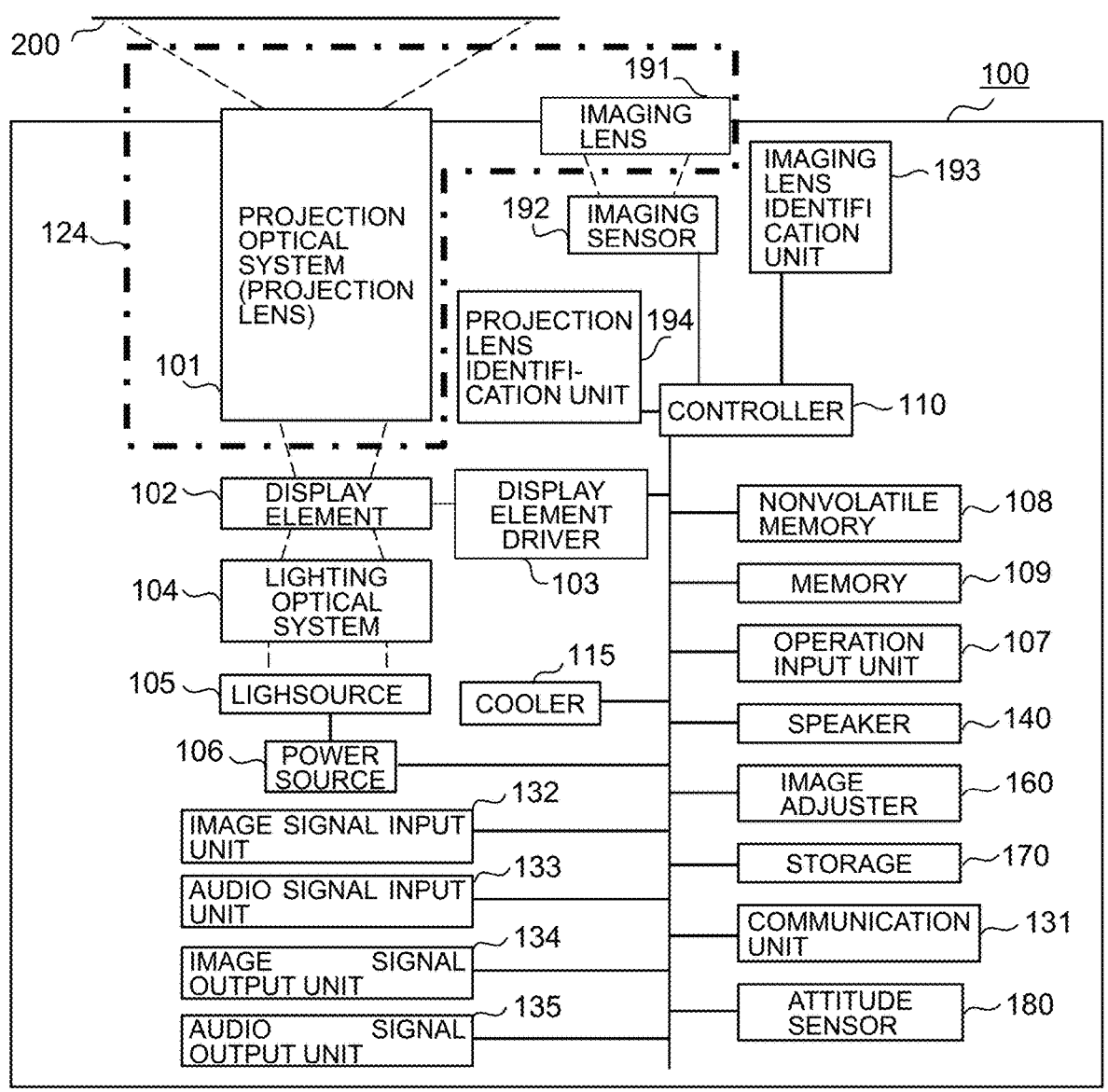
FIG. 1C is a configuration block diagram of further another modification example of a projection type image display apparatus in the first embodiment.

In addition, the configuration may be as in FIG. 1C, as further another modification example in which the imaging lens 191 is attached to and detached from the projection type image display apparatus 100 in a different manner. Namely, in FIG. 1C, a portion including the imaging lens 191 and the projection optical system (projection lens) 101 illustrated by an alternate long and short dash line is a lens unit 124, and the lens unit 124 is configured to be detachably attachable to the projection type image display apparatus 100. In this case, the imaging lens identification unit 193 identifies the type and/or the performance of the imaging lens 191 mounted in the projection type image display apparatus 100. The projection lens identification unit 194 identifies the type and/or the performance of the projection lens 101 mounted in the projection type image display apparatus 100.

A configuration of the imaging lens identification unit 193, a configuration of the projection lens identification unit 194, and a process of the imaging lens identification unit 193 and the projection lens identification unit 194 when the lens unit is attached and detached will be described later.

Incidentally, as illustrated in FIG. 1C, when the imaging lens 191 and the projection optical system (projection lens) 101 are configured to be detachably attachable to the projection type image display apparatus 100 by way of a lens unit, the individual provision of the imaging lens identification unit 193 and the projection lens identification unit 194 is not required, and both may be integrated into a lens unit identification unit. The lens unit identification unit may identify the type of the lens unit, the type of the imaging lens, and/or the type of the projection lens.

Figure 1D:
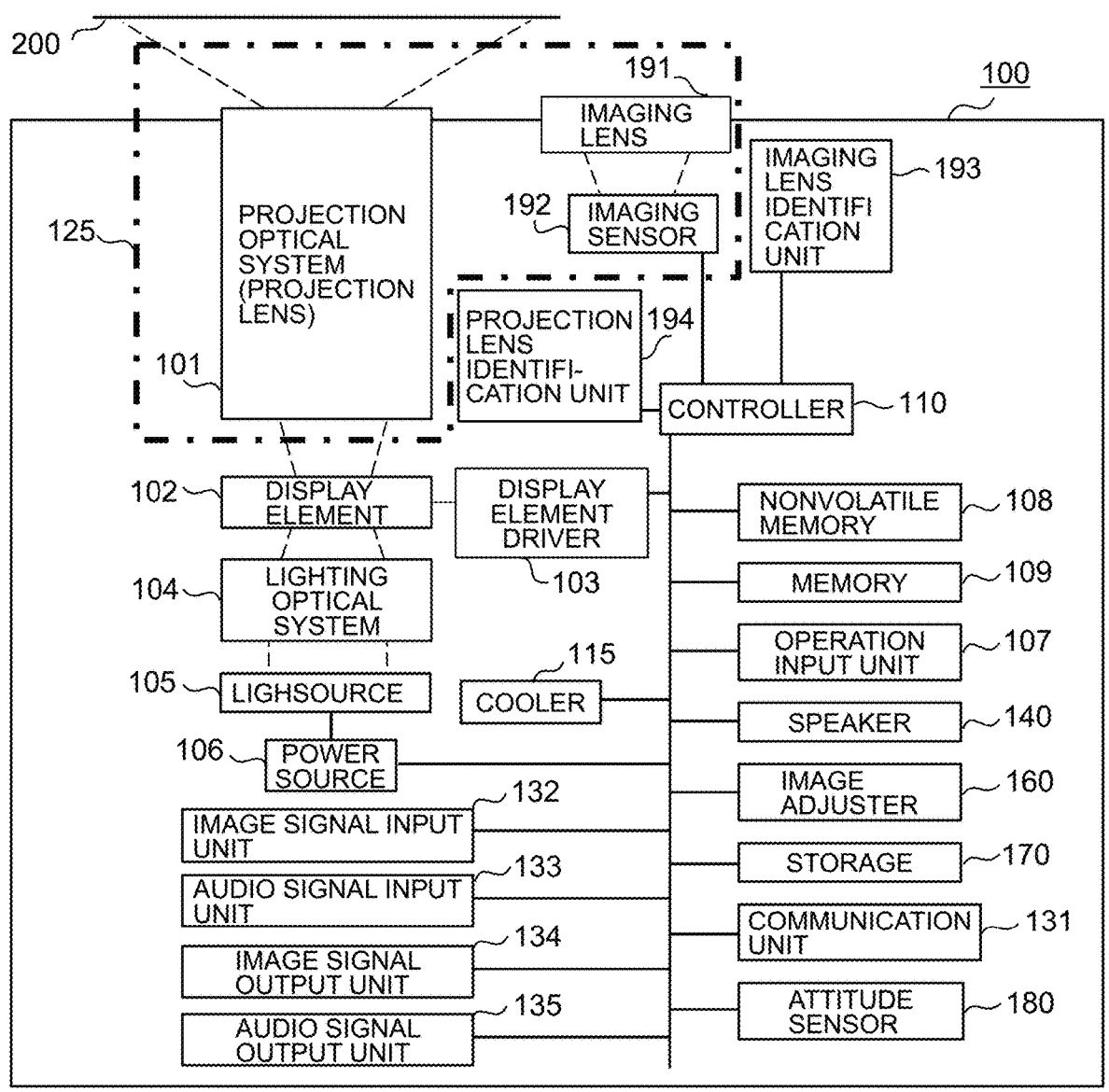
FIG. 1D is a configuration block diagram of further another modification example of a projection type image display apparatus in the first embodiment.

In addition, the configuration may be as in FIG. 1D, as further another modification example in which the imaging lens 191 is attached to and detached from the projection type image display apparatus 100 in a different manner. Namely, as illustrated in FIG. 1D, a portion including the imaging lens 191, the imaging sensor 192, and the projection optical system (projection lens) 101 illustrated by an alternate long and short dash line is a lens unit 125, and the lens unit 125 is configured to be detachably attachable to the projection type image display apparatus 100. In this case, the imaging lens identification unit 193 identifies the type and/or the performance of the imaging lens 191 mounted in the projection type image display apparatus 100. The projection lens identification unit 194 identifies the type and/or the performance of the projection lens 101 mounted in the projection type image display apparatus 100.

A configuration of the imaging lens identification unit 193, a configuration of the projection lens identification unit 194, and a process of the imaging lens identification unit 193 and the projection lens identification unit 194 when the lens unit is attached and detached will be described later.

Incidentally, as illustrated in FIG. 1D, when the imaging lens 191, the imaging sensor 192, and the projection optical system (projection lens) 101 are configured to be detachably attachable to the projection type image display apparatus 100 by way of a lens unit, the individual provision of the imaging lens identification unit 193 and the projection lens identification unit 194 is not required, and both may be integrated into a lens unit identification unit. The lens unit identification unit may identify the type of the lens unit, the type of the imaging lens, the type of the imaging sensor, and/or the type of the projection lens.

As described above, various functions can be installed in the projection type image display apparatus 100.

Figure 2A:
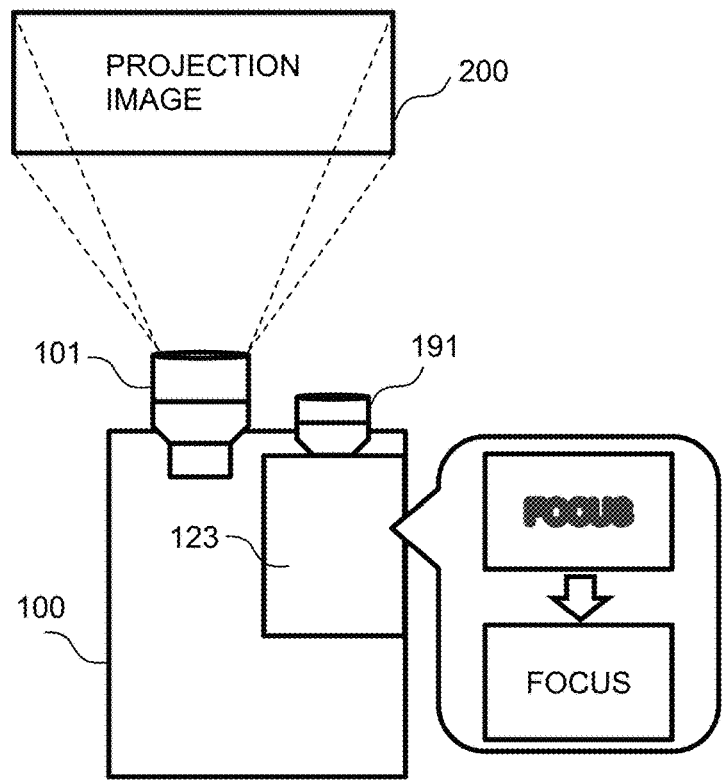
FIG. 2A is a view describing one example of operation of the projection type image display apparatus in the first embodiment.

FIG. 2A is a view describing one example of operation of the projection type image display apparatus 100 in the present embodiment. As illustrated in FIG. 2A, the projection type image display apparatus 100 includes the camera unit 123 including the imaging lens 191 and the imaging sensor 192. As one example of the operation, a projection image may be captured by the imaging sensor 192, and a focus gasping process of the projection lens 101 on the screen may be performed using the imaging result. In such a manner, the projection type image display apparatus having the autofocus function using the imaging sensor instead of a manual operation by a user can be realized. For detailed operation, various known techniques may be used.

Figure 2B:
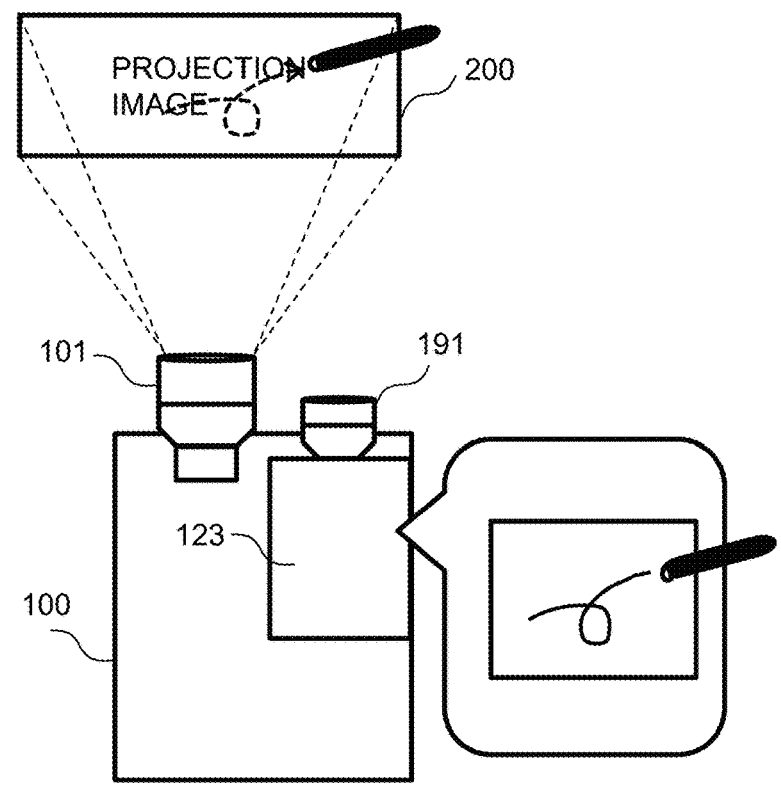
FIG. 2B is a view describing another example of operation of the projection type image display apparatus in the first embodiment.

FIG. 2B is a view describing one example of another operation of the projection type image display apparatus 100 in the present embodiment. As illustrated in FIG. 2B, the projection type image display apparatus 100 causes the camera unit 123 to track a trajectory on the display surface (screen) 200 drawn with a pen-shaped device or the like by a user, and displays the trajectory on a projection image. Accordingly, the projection type image display apparatus having an interactive function can be realized. For tracking, various known techniques may be used such as installing an infrared ray emitting function in the pen-shaped device or an infrared laser curtain method by which infrared rays are reflected when the pen-shaped device comes into contact with the display surface (screen).

Figure 2C:
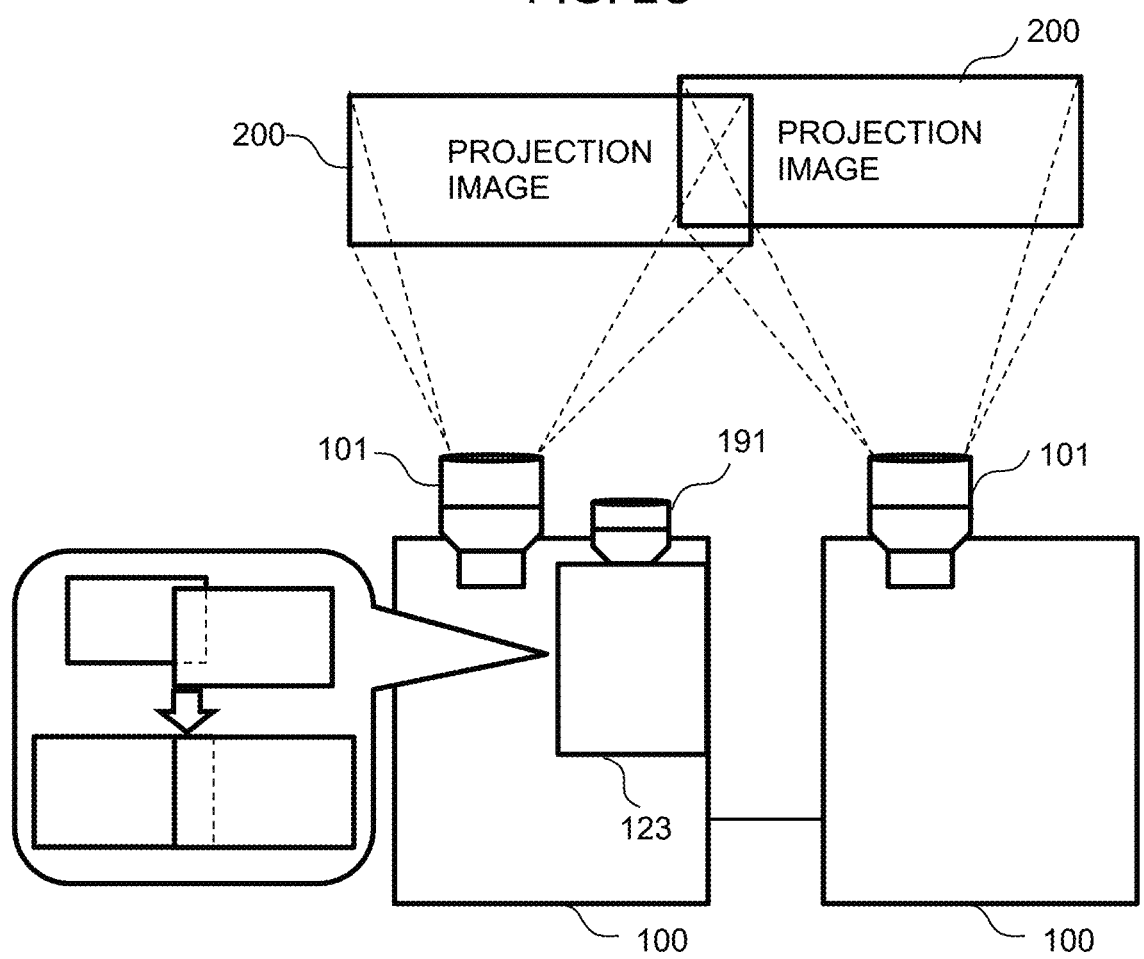
FIG. 2C is a view describing further another example of operation of the projection type image display apparatus in the first embodiment.

FIG. 2C is a view describing one example of further another operation of the projection type image display apparatus 100 in the present embodiment. As illustrated in FIG. 2C, the camera units 123 capture a plurality of projection images of a plurality of the projection type image display apparatuses 100 having a lens shift function capable of adjusting the position of a projection image, and the positions of the projection images are adjusted using the imaging result such that the plurality of projection images are overlaid in a desired state. For example, as the desired state, there are a blending projection state in which end portions of a plurality of projection images are overlaid on each other to form one large projection image, and a stack projection state in which a plurality of projection images are overlaid on each other in almost its entirety at the same position. The projection type image display apparatus having an automatic projection image overlay adjustment function can be realized by repeating the imaging and the position adjustment. Since the projection image overlay adjustment function is also called an edge blending function, the automatic overlay adjustment function is also called an automatic edge blending function.

When the automatic overlay adjustment function is performed, for example, an analysis process is performed based on a captured image of the camera unit of at least one projection type image display apparatus of a plurality of the projection type image display apparatuses. The one projection type image display apparatus detects, for example, a shape difference, a position difference, a brightness difference or a color difference between a plurality of projection images, or a combination thereof from the analysis process. The one projection type image display apparatus may control the shape, position, brightness, or color of the projection image of the host apparatus and/or the other projection type image display apparatuses based on a detection result such that the shape difference, the position difference, the brightness difference, or the color difference between the plurality of projection images is reduced. When the other projection type image display apparatuses are controlled, the plurality of projection type image display apparatuses may be connected to each other via a wired communication I/F or a wireless communication I/F, and control information may be communicated therebetween via the wired communication I/F or the wireless communication I/F. Incidentally, regarding control of the shape, brightness, or color of a projection image, the entirety of the projection image may be controlled or a partial range such as an end portion of the projection image may be controlled. Control of the shape of a projection image includes linear or nonlinear deformation control and the like. In addition, control of the brightness or color of a projection image also includes control of uniform brightness or color in the entirety of the projection image or in a predetermined portion of the projection image, and includes control of brightness or color that changes linearly or nonlinearly according to a position in the entirety of the projection image or in the predetermined portion of the projection image. For detailed operation, various known techniques may be used.

FIG. 3 is a view describing a combination of the projection lens and the imaging lens of the projection type image display apparatus in the present embodiment. As illustrated in FIG. 3, the projection type image display apparatus in the present embodiment has a configuration in which a plurality of types of projection lenses (replacement lenses) having different focal lengths can be selected and attached and detached such that a user can select a screen size and a projection distance. Namely, in FIG. 3, (A) illustrates a case where a long focal length lens 201 is used as the projection lens, (B) illustrates a case where a middle focal length lens 301 is used as the projection lens, and (C) illustrates a case where an ultra-short focal length lens 401 is used as the projection lens.

In the projection type image display apparatus of the present embodiment, since the projection lens (replacement lens) is configured to be attachable and detachable, and the camera unit (or imaging lens) is configured to be attachable and detachable, when one projection lens of a plurality of projection lenses having different focal lengths is selected and mounted, an imaging lens suitable for the selected projection lens is mounted and used, so that the projection type image display apparatus including a more suitable combination of the projection lens and the imaging lens can be used.

Specifically, when the projection lens is the middle focal length lens 301 having a wide angle as in FIG. 3(B), a camera unit 303 needs to be capable of capturing a wider range of image than a projection image. Therefore, a middle focal length imaging lens 302 having a wider angle than that of the middle focal length lens as the projection lens has to be used. In this state, when the projection lens is replaced with the long focal length lens 201 as in FIG. 3(A), an image including the projection image can be captured even with the camera unit 303 using the imaging lens 302 having a wider angle than that of the projection lens that is a middle focal length lens, but a ratio of the projection image to an imaging range is reduced. In this case, an actual resolution at which an image of the projection image range is captured is reduced.

On the other hand, if the camera unit (or imaging lens) can also be attached and detached for replacement as in the projection type image display apparatus of the present embodiment, when the projection lens is replaced with the long focal length lens 201 as in FIG. 3(A), the camera unit can be replaced with a camera unit 203 including a long focal length imaging lens 202 having a longer focal length than that of the middle focal length imaging lens 302 when the middle focal length lens 301 is used. Accordingly, the ratio of the projection image to the imaging range can be made more appropriate, and a reduction in the above actual resolution can be more suitably suppressed. Namely, in the projection type image display apparatus of the present embodiment, since the projection lens can be attached and detached for replacement, and the camera unit or the imaging lens can also be attached and detached for replacement, an imaging lens more suitable for the focal length of each projection lens can be used.

In addition, unlike the long focal length lens 201 or the middle focal length lens 301, the ultra-short focal length lens 401 illustrated in FIG. 3(C) may project an image in a steep direction in which an angle of elevation with respect to a front direction (optical axis direction of the long focal length lens or the middle focal length lens) of the projection type image display apparatus is large. Then, there is a high possibility that an angle of an imaging range of the imaging lens cannot also be covered at all in an imaging range of an imaging sensor for the long focal length lens 201 or in an imaging range of an imaging sensor for the middle focal length lens 301. In the projection type image display apparatus of the present embodiment, even when the projection lens is replaced with the ultra-short focal length lens 401, the camera unit or the imaging lens can be replaced with a camera unit 403 for the ultra-short focal length projection lens or an ultra-short focal length imaging lens 402, so that the ultra-short focal length imaging lens 402 more suitable for the ultra-short focal length lens 401 can be used.

Further, in a plurality of replaceable imaging lenses, the F-number, the transmittance, the color balance of transmitted light, and the optical distortion of a lens are difficult to adapt for all the imaging lenses. Therefore, in the projection type image display apparatus of the present embodiment, when the camera unit or the imaging lens is replaced, it is desirable that the setting of a brightness correction, a color correction, or an optical distortion correction of a captured image to be performed by the camera unit or the controller is changed according to characteristics of the imaging lens after replacement. Accordingly, the possibility of erroneous control caused by the replacement of the camera unit or the imaging lens can be further suppressed. Incidentally, the optical distortion correction includes a correction in which a geometric correction is performed on a captured image to convert the shape of the captured projection image into an appropriate shape.

Figure 4:
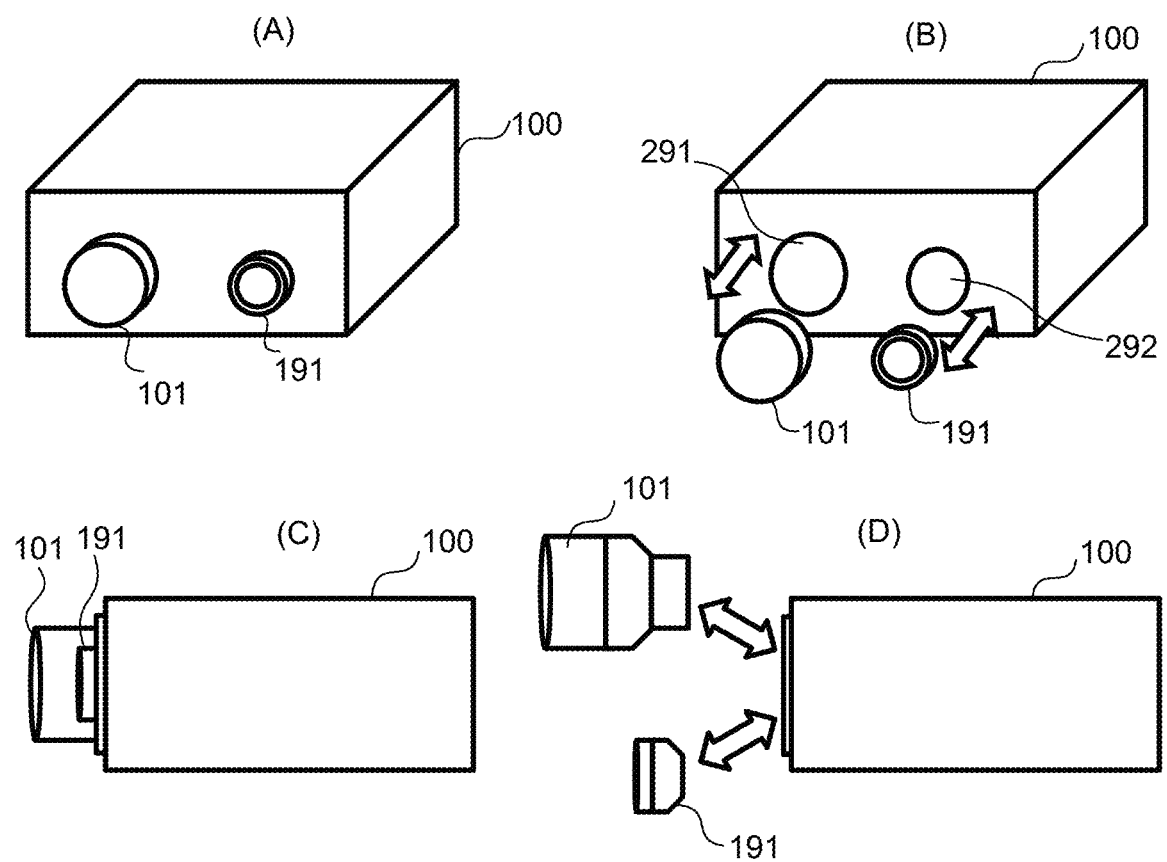
FIG. 4 is a descriptive view of the attachment and detachment of the imaging lens (or camera unit) and the projection lens of the projection type image display apparatus in the first embodiment.

FIG. 4 is a descriptive view of the attachment and detachment of the imaging lens (or camera unit) and the projection lens of the projection type image display apparatus in the present embodiment. In FIG. 4, (A) illustrates a state where the projection lens 101 and the imaging lens 191 each are mounted in the projection type image display apparatus 100, and (B) illustrates a configuration in which the projection lens 101 and the imaging lens 191 are individually attachable and detachable. Incidentally, the imaging lens may be replaced for each camera unit. In addition, reference sign 291 denotes a projection lens mounting portion that allows one replaceable projection lens of a plurality of replaceable projection lenses to be selectively mounted in the projection type image display apparatus, and reference sign 292 denotes an imaging lens mounting portion (camera unit mounting portion) that allows one replaceable imaging lens (camera unit) of a plurality of replaceable imaging lenses (camera units) to be selectively mounted in the projection type image display apparatus. In addition, (C) is a side view of (A), and (D) is a side view of (B).

Figure 5:
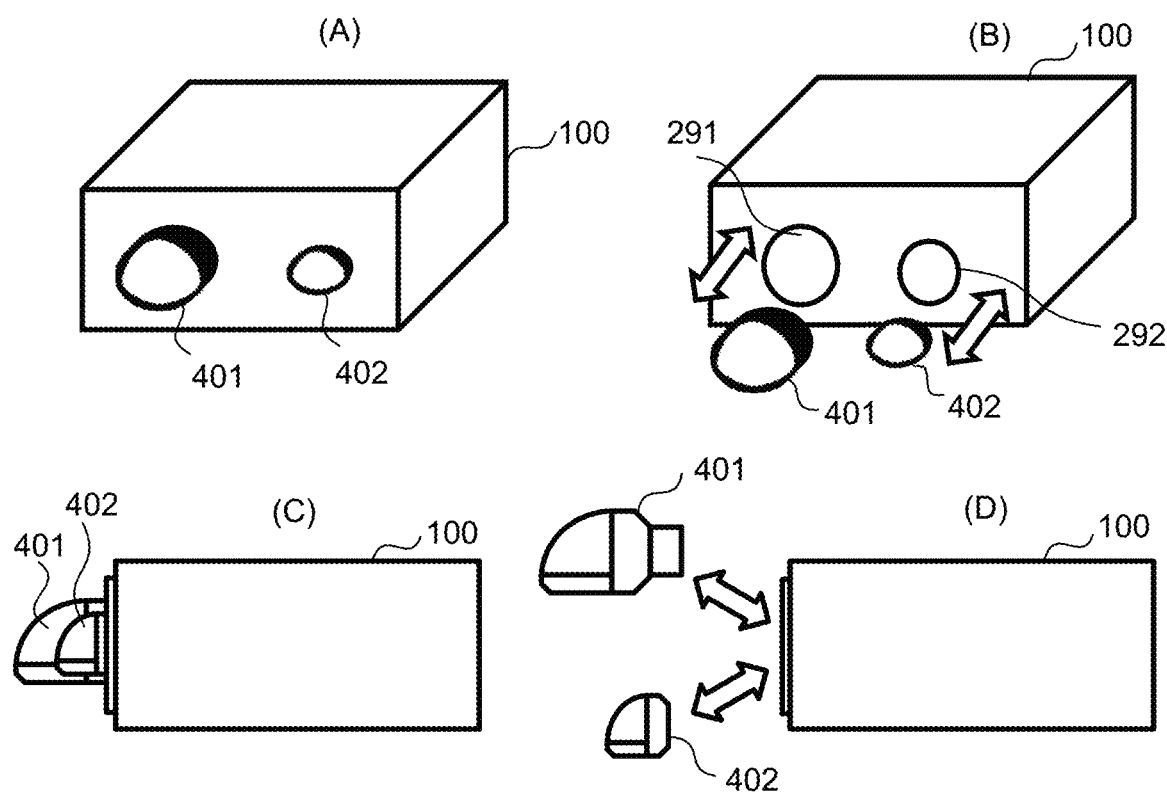
FIG. 5 is a descriptive view of another example of the attachment and detachment of the imaging lens (or camera unit) and the projection lens of the projection type image display apparatus in the first embodiment.

FIG. 5 is a descriptive view of another example in which the imaging lens (or camera unit) and the projection lens of the projection type image display apparatus in the present embodiment are individually attached and detached. FIG. 5 illustrates an example in which an ultra-short focal length lens is used as the projection lens to be attached and detached. In FIG. 5, the same configurations as those in FIG. 4 are denoted by the same reference signs, and a description thereof will be omitted.

In FIG. 5, (A) illustrates a state where the ultra-short focal length lens 401 and the ultra-short focal length imaging lens 402 each are mounted in the projection type image display apparatus 100, and (B) illustrates a configuration in which the ultra-short focal length lens 401 and the ultra-short focal length imaging lens 402 are individually attachable and detachable. In addition, (C) is a side view of (A), and (D) is a side view of (B). When an ultra-short focal length lens is mounted in the projection type image display apparatus, an imaging lens (or camera unit) for an ultra-short focal length lens also needs to be mounted as the imaging lens (or camera unit).

Figure 6A:
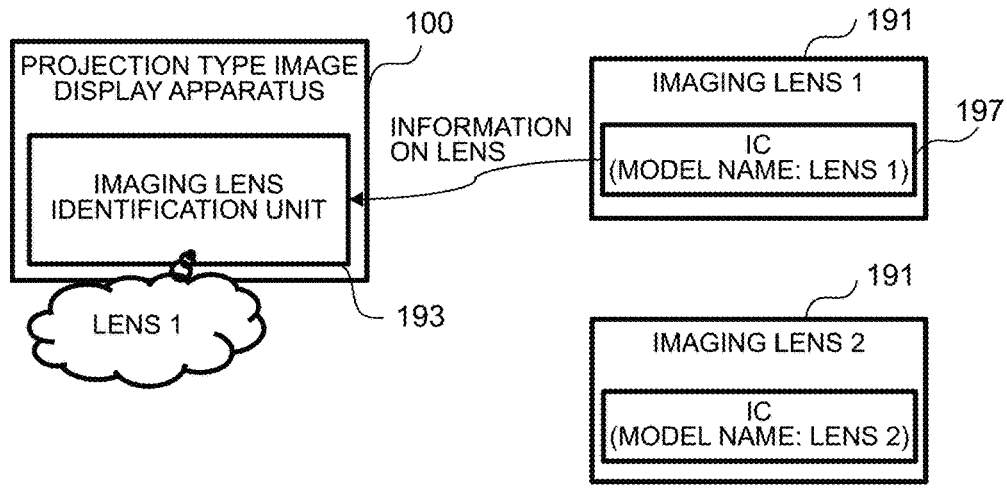
FIG. 6A is a view describing a method for identifying an imaging lens (or camera unit) after replacement in the first embodiment.
Figure 6B:
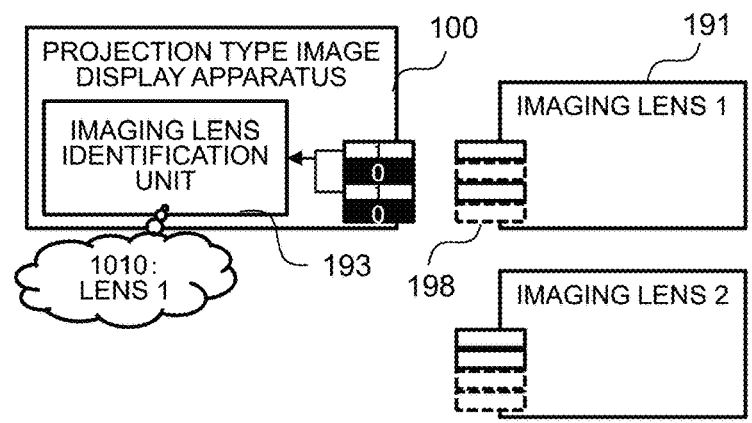
FIG. 6B is a view describing another example of a method for identifying an imaging lens (or camera unit) after replacement in the first embodiment.
Figure 6C:
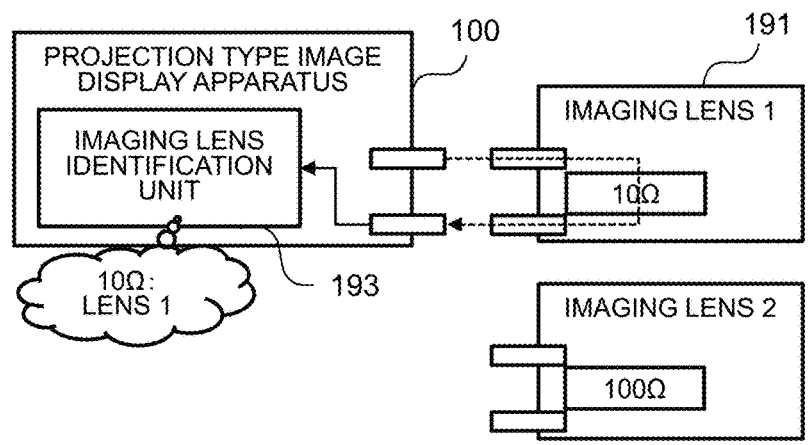
FIG. 6C is a view describing further another example of a method for identifying an imaging lens (or camera unit) after replacement in the first embodiment.

Here, a method for identifying an imaging lens (or camera unit) after replacement will be described. As the simplest method for identifying an imaging lens (or camera unit) after replacement, there is a method in which a user selects the type of an imaging lens (or camera unit) after replacement via a menu after replacement. In FIGS. 6A to 6C below, even when a selection via the menu is not made by the user, a method in which the projection type image display apparatus is capable of automatically identifying an imaging lens after replacement will be described.

FIG. 6A is a descriptive view of one example of a method for identifying an imaging lens (or camera unit) using communication in the projection type image display apparatus according to the present embodiment. In FIG. 6A, the projection type image display apparatus 100 includes an identification unit for the imaging lens 191 (or camera unit) (hereinafter, referred to as the imaging lens identification unit 193). The imaging lens 191 (or camera unit) includes an integrated circuit (IC) 197 having imaging lens (or camera unit) identification information such as a unique ID number or the model name of an imaging lens (or camera unit).

When the imaging lens 191 (or camera unit) is mounted, the projection type image display apparatus 100 is capable of acquiring imaging lens (or camera unit) identification information from the IC 197 of an imaging lens (or camera unit), and of identifying the imaging lens (or camera unit).

In addition, the projection type image display apparatus may change the setting of a correction of a captured image described with reference to FIG. 3, according to the type of the imaging lens (or camera unit) based on an identification result.

Incidentally, imaging lens (or camera unit) characteristics information may be determined from information on the imaging lens (or camera unit) identified by the image display apparatus. In addition, as another method, the IC may be configured to have imaging lens characteristics information and to acquire information indicating imaging lens (or camera unit) characteristics themselves instead of the identification information.

In addition, the imaging lens identification unit may be configured to include an IC information reader that is hardware that reads information from the IC. The configuration may be such that simply, the IC information reader is provided and information read by the IC information reader is processed by the controller to identify the imaging lens (or camera unit).

FIG. 6B is a view describing a method in which an imaging lens (or camera unit) is identified by a junction terminal of the imaging lens (or camera unit) in the projection type image display apparatus according to the present embodiment. In FIG. 6B, the projection type image display apparatus 100 includes the imaging lens identification unit 193. An imaging lens (or camera unit) includes, for example, a switch 198 for identifying an imaging lens (or camera unit) in a connection portion between the imaging lens and the projection type image display apparatus, and the imaging lens identification unit of the projection type image display apparatus identifies the type of the connected imaging lens (or camera unit) based on an ON/OFF pattern of the switch.

In addition to whether or not the switch is physically connected, for example, when the switch is connected by a plurality of electrical terminals and some terminals are grounded, whether or not the switch is connected may be determined by an electrical pattern of the switch.

In addition, the projection type image display apparatus may change the setting of a correction of a captured image described with reference to FIG. 3, according to the type of the imaging lens (or camera unit) based on an identification result.

Incidentally, the imaging lens identification unit may be configured to include a switch determination unit that reads an ON/OFF state of the switch. The configuration may be such that simply, the switch determination unit is provided and information on a state of the switch determined by the switch determination unit is processed by the controller to identify an imaging lens (or camera unit).

FIG. 6C is a view describing a method for identifying an imaging lens (or camera unit) based on an electrical characteristic such as voltage, current, a resistance value, or electric power in a configuration in which an electrical circuit is provided in a connection portion between the projection type image display apparatus and an imaging lens (or camera unit) in the present embodiment.

In FIG. 6C, the imaging lens (or camera unit) has a unique resistance for each type for identifying an imaging lens (or camera unit) in the connection portion between the imaging lens and the projection type image display apparatus. The projection type image display apparatus includes the imaging lens identification unit 193, and further includes a measurement unit that measures an electrical characteristic of the connection portion of the imaging lens (or camera unit). When an imaging lens (or camera unit) is connected, the measurement unit measures an electrical characteristic of a terminal, and the imaging lens identification unit identifies the connected imaging lens (or camera unit) using the measurement result.

The electrical characteristic used for identification may be any one of voltage, current, a resistance value, and electric power. Alternatively, a combination of the above electrical characteristics may be used.

In addition, the projection type image display apparatus may change the setting of a correction of a captured image described with reference to FIG. 3, according to the type of the imaging lens (or camera unit) based on an identification result.

Incidentally, the configuration may be such that simply, the measurement unit is provided and electrical characteristics information of the terminal measured by the measurement unit is processed by the controller to identify an imaging lens (or camera unit).

As described above, the configurations and the methods for identifying the type of an imaging lens (or camera unit) to be mounted in (connected to) the projection type image display apparatus have been described with reference to FIGS. 6A to 6C. The projection type image display apparatus may be further equipped with a configuration for identifying the type of a projection lens to be mounted in (connected to) the projection type image display apparatus. The configuration for identifying the type of a projection lens may be realized by providing the projection lens instead of the imaging lens (or camera unit) and by providing the projection lens identification unit instead of the imaging lens identification unit of the projection type image display apparatus in the configuration described with reference to FIGS. 6A to 6C. Since the operation may be realized by replacing the process of identifying the type of an imaging lens (or camera unit) described with reference to FIGS. 6A to 6C with a process of identifying the type of a projection lens, a description thereof will not be repeated again.

Incidentally, when both the identification of the type of an imaging lens (or camera unit) and the identification of the type of a projection lens are implemented, an identification unit having both the function of the imaging lens identification unit and the function of the projection lens identification unit may be provided. Alternatively, the controller may execute both an imaging lens identification process of the imaging lens identification unit and a projection lens identification process of the projection lens identification unit.

As described with reference to FIGS. 4 and 5, in the example in which the imaging lens (or camera unit) and the projection lens are individually attached and detached, when a desired projection lens is mounted in the projection type image display apparatus, a user needs to select and mount an imaging lens (or camera unit) suitable for the projection lens. For this reason, in the projection type image display apparatus according to the present embodiment, a combination of imaging lenses suitable for each projection lens is set as a "recommended combination", and information on the "recommended combination" is stored in the memory of the projection type image display apparatus. The type of a projection lens that is actually mounted by a user and the type of an imaging lens (or camera unit) may be identified, and operation and a warning process of the projection type image display apparatus may be performed, for example, as illustrated in FIG. 7 according to an identified combination.

FIG. 7 is a table describing combinations of projection lenses and imaging lenses in the present embodiment. In FIG. 7, recommended combinations are (1) an ultra-short focal length projection lens and an imaging lens (or camera unit) for an ultra-short focal length lens, (2) a middle focal length projection lens and an imaging lens (or camera unit) for a middle focal length lens, and (3) a long focal length projection lens and an imaging lens (or camera unit) for a long focal length lens.

FIG. 7 illustrates examples of combinations of projection lenses and imaging lenses (or camera units), and of the operation and the presence and absence of a warning of the projection type image display apparatus.

In FIG. 7 and in the following description, "warning" refers to a process of displaying a message or a mark in a projection image, the message or the mark indicating that a combination of a projection lens and an imaging lens (or camera unit) is not a recommended combination, or of issuing an audio indicating the intention from a speaker. At this time, a process of displaying a model number of an imaging lens (or camera unit) recommended to be used together with the mounted projection lens in the projection image by a message or a mark, or of issuing the model number from the speaker by audio may be performed. In addition, together with the warning process, an inquiry image or audio to inquire the user whether or not the state is continued as it is may be output to prompt the user to perform an operation input.

In addition, in the concept of "operating" and "not operating" in FIG. 7 and in the following description, the target is the operation of the projection type image display apparatus using an imaging lens (or camera unit). For example, it is assumed that the autofocus function using an imaging lens (or camera unit) described with reference to FIG. 2A, the interactive function using an imaging lens (or camera unit) described with reference to FIG. 2B, or the automatic edge blending function using an imaging lens (or camera unit) described with reference to FIG. 2C is disabled.

Hereinafter, a warning and an operation in each combination of FIG. 7 will be described.

Combination [A]: Since the combination is a recommended combination, an operation is performed without warning.

Combination [B]: Since the combination is not a recommended combination, a warning is to be issued. The imaging lens for an ultra-short focal length lens does not operate in combination with the projection lenses other than the ultra-short focal length lens.

Combination [C]: Since the combination is not a recommended combination, a warning is to be issued. The imaging lens for an ultra-short focal length lens does not operate in combination with the projection lenses other than the ultra-short focal length lens. Namely, since the ultra-short focal length lens has a different angle of view, there is a possibility that an image to be captured is deformed.

Combination [D]: Since the combination is not a recommended combination, a warning is to be issued. The ultra-short focal length lens does not operate in combination with the imaging lenses other than the imaging lens for an ultra-short focal length lens.

Combination [E]: Since the combination is a recommended combination, an operation is performed without warning.

Combination [F]: Since the combination is not a recommended combination, a warning is to be issued. However, since the projection range of the long focal length lens is included in the imaging range of the imaging sensor for a middle focal length lens, in this combination, when a warning is issued, the accuracy decreases but an operation can be performed.

Combination [G]: Since the combination is not a recommended combination, a warning is to be issued. The ultrashort focal length lens does not operate in combination with the imaging lenses other than the imaging lens for an ultra-short focal length lens.

Combination [H]: Since the combination is not a recommended combination, a warning is to be issued. However, since the projection range of the middle focal length lens is out of the imaging range of the imaging sensor for a long focal length lens, in this combination, an operation is not performed.

Combination [I]: Since the combination is a recommended combination, an operation is performed without warning.

The controller may control each portion to perform the above combinations of warnings and operations.

As described above, the projection type image display apparatus in the present embodiment identifies the type of a projection lens mounted by a user and the type of an imaging lens (or camera unit), and switches the operation and the warning process of the projection type image display apparatus according to an identified combination. Hence, when the combination is a recommended com, the projection type image display apparatus operates as it is, and when the combination is not a recommended combination, the projection type image display apparatus issues a warning, and disables some functions using the imaging lens (or camera unit) (may be expressed as limiting the operation). Accordingly, it can be prevented that a user uses the projection type image display apparatus in a non-recommended combination of a projection lens and an imaging lens (or camera unit) as it is to cause some functions to be erroneously operated.

Incidentally, a menu screen may be provided which has a setting to allow a user to switch manually a function, which is identified as a combination of "not operating" in the operations illustrated in FIG. 7 and is controlled to the state "not operating" by the controller, to the state of "operating". The reason is that the function of identifying an imaging lens (or camera unit) and/or the function of identifying a projection lens may be in an error state for some reason not to be capable of outputting a correct identification result. Even in such an error state, if a user has mounted a correct recommended combination of a projection lens and an imaging lens (or camera unit), the user can manually enable the above some functions using an imaging lens (or camera unit) via the menu as they are.

Next, as a modification example of the projection type image display apparatus in the present embodiment, an example will be described in which a projection lens and an imaging lens (or camera unit) are configured as an integrated lens unit so as to be detachably attachable to the projection type image display apparatus by way of a lens unit.

Figure 8:
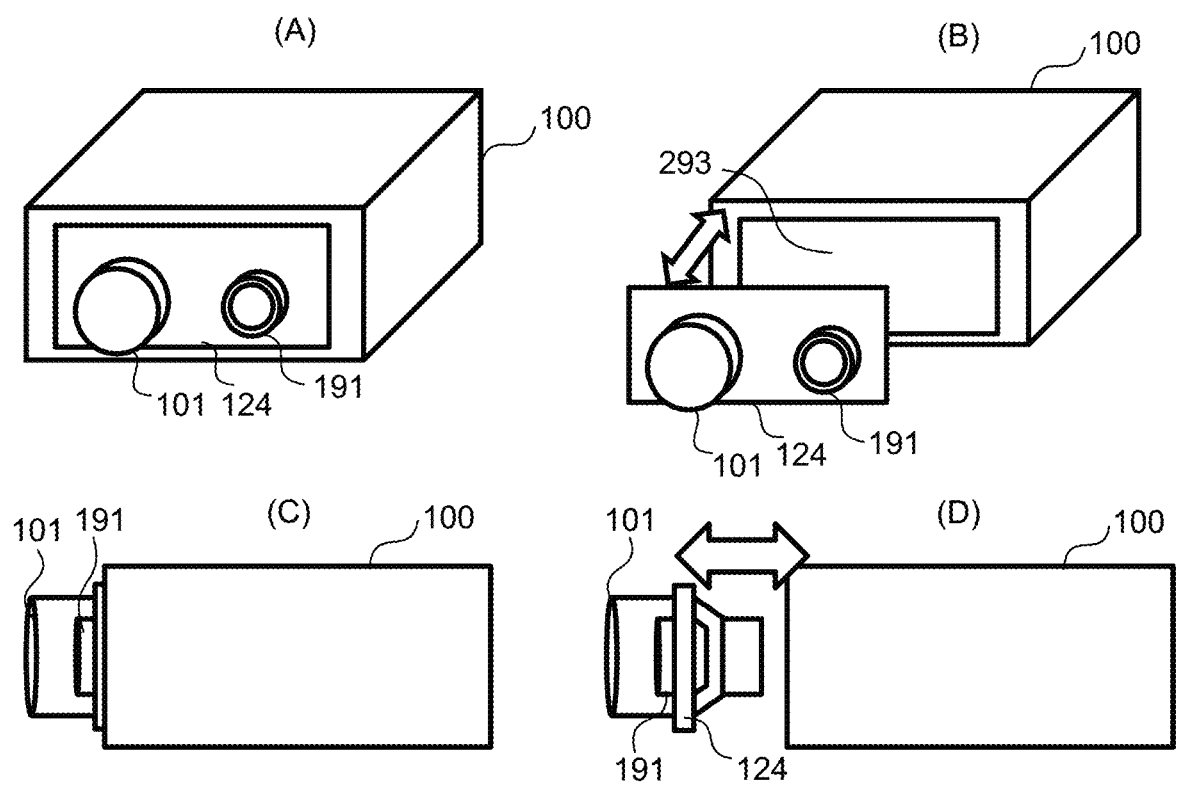
FIG. 8 is a descriptive view of a configuration in which a projection lens and an imaging lens (or camera unit) are attachable and detachable by way of an integrated lens unit in the first embodiment.

FIG. 8 is a descriptive view of a configuration in which a projection lens and an imaging lens (or camera unit) are configured as an integrated lens unit so as to be attachable and detachable by way of a lens unit in the present embodiment. In FIG. 8, (A) illustrates a state where the projection lens 101 and the imaging lens 191 are mounted in the projection type image display apparatus 100 as an integrated lens unit, and (B) illustrates a configuration in which the projection lens 101 and the imaging lens 191 are configured to be attachable and detachable by way of an integrated lens unit. Incidentally, reference sign 293 denotes a lens unit mounting portion that allows one replaceable lens unit of a plurality of replaceable lens units to be selectively mounted in the projection type image display apparatus. In addition, (C) is a side view of (A), and (D) is a side view of (B).

In the projection type image display apparatus illustrated in FIG. 8, when the projection lens is replaced, an imaging lens more suitable for the focal length of each projection lens can be used. Therefore, a projection lens having a predetermined focal length and an imaging lens (or camera unit) suitable for the projection lens are configured as an integrated lens unit in advance. In such a manner, when a user replaces the projection lens with a desired projection lens, the user does not need to examine and select an imaging lens (or camera unit) suitable for the projection lens having a predetermined focal length since the imaging lens (or camera unit) suitable for the projection lens is already integrated and connected. In this case, the labor and time required for the user to install the projection type image display apparatus is saved, which is preferable.

Incidentally, as a process of identifying the type of an imaging lens (or camera unit), the process of identifying the type of an imaging lens (or camera unit) described with reference to FIGS. 6A to 6C may be installed.

In FIG. 8, the projection lens and the imaging lens (or camera unit) are attachable and detachable by way of an integrated lens unit, but as described with reference to FIGS. 6A to 6C, the process of identifying a projection lens may be installed separately from the process of identifying the type of an imaging lens (or camera unit). In this case, a configuration for identifying an projection lens and a configuration for identifying an imaging lens (or camera unit) are separately installed in the lens unit in which the projection lens and the imaging lens (or camera unit) are integrated.

In addition, when information on combinations of projection lenses and imaging lenses (or camera units) are stored in the memory of the projection type image display apparatus in advance, a lens unit side in which the projection lens and the imaging lens (or camera unit) are integrated may include only a configuration for identifying one of a projection lens and an imaging lens (or camera unit). In such a manner, the projection type image display apparatus may be configured to perform a process of identifying the one and to identify both the type of the projection lens and the type of the imaging lens (or camera unit) based on a result of the identification process and with reference to the information on combinations of projection lenses and imaging lenses (or camera units) stored in the memory.

Specifically, the lens unit side in which the projection lens and the imaging lens (or camera unit) are integrated includes only the configuration for identifying an imaging lens (or camera unit), and the projection type image display apparatus performs a process of identifying the connected imaging lens (or camera unit) using the method described with reference to FIGS. 6A to 6C. Further, the type of the projection lens may also be identified with reference to the type of the identified imaging lens (or camera unit) and the information on combinations of projection lenses and imaging lenses (or camera units) stored in the memory. In addition, as another configuration, the lens unit side in which the projection lens and the imaging lens (or camera unit) are integrated includes only the configuration for identifying a projection lens, and the projection type image display apparatus performs a process of identifying the connected projection lens. Further, the type of the imaging lens (or camera unit) may also be identified with reference to the type of the identified projection lens and the information on combinations of projection lenses and imaging lenses (or camera units) stored in the memory.

Figure 9:
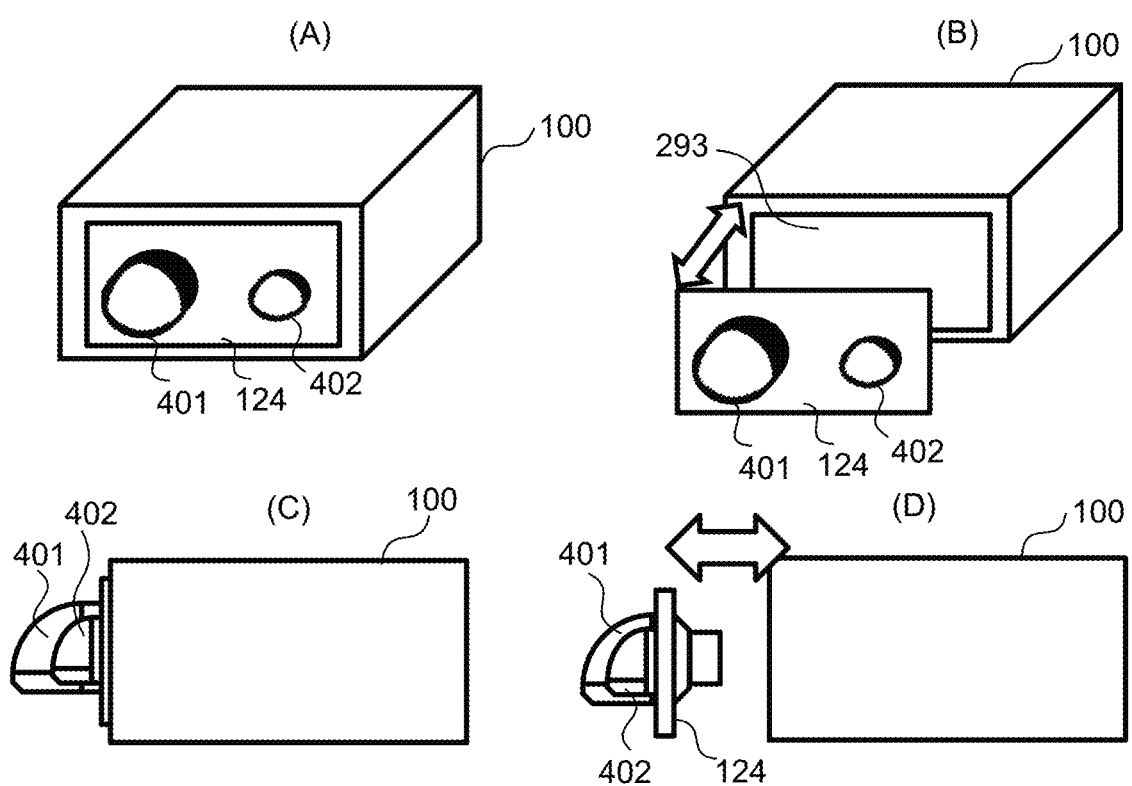
FIG. 9 is a descriptive view of another example of a configuration in which a projection lens and an imaging lens (or camera unit) are attachable and detachable by way of an integrated lens unit in the first embodiment.

FIG. 9 is a descriptive view of another example in which an imaging lens (or camera unit) and a projection lens of the projection type image display apparatus in the present embodiment are integrally attached and detached as a lens unit. FIG. 9 illustrates an example in which an ultra-short focal length lens is used as the projection lens to be attached and detached. In FIG. 9, the same configurations as those in FIG. 8 are denoted by the same reference signs, and a description thereof will be omitted. In FIG. 9, (A) illustrates a state where the ultra-short focal length lens 401 and the ultra-short focal length imaging lens 402 are mounted in the projection type image display apparatus 100 as the integrated lens unit 124, and (B) illustrates a configuration in which the ultra-short focal length lens 401 and the ultra-short focal length imaging lens 402 are attachable and detachable by way of an integrated lens unit. In addition, (C) is a side view of (A), and (D) is a side view of (B).

As illustrated in FIG. 9, the imaging lens (or camera unit) for an ultra-short focal length lens is integrated in the lens unit including the ultra-short focal length lens. When a user replaces the projection lens of the projection type image display apparatus with an ultra-short focal length lens, the user may remove the current lens unit and replace the current lens unit with a lens unit in which a projection lens that is an ultra-short focal length lens and an imaging lens (or camera unit) for an ultra-short focal length lens are integrated, and the lens unit can be easily replaced. Incidentally, since a configuration and a process related to the process of identifying an imaging lens (or camera unit) or the process of identifying a projection lens are the same as those in FIG. 8, a description thereof will be omitted.

As described above, according to the present embodiment, the projection type image display apparatus can be provided in which the imaging lens can be replaced according to the focal length of the projection lens.

Second Embodiment

In the present embodiment, a case will be described in which in a projection type image display apparatus including an imaging function, the lens shift function is realized by a projection lens that projects an image onto a front screen.

Figure 10:
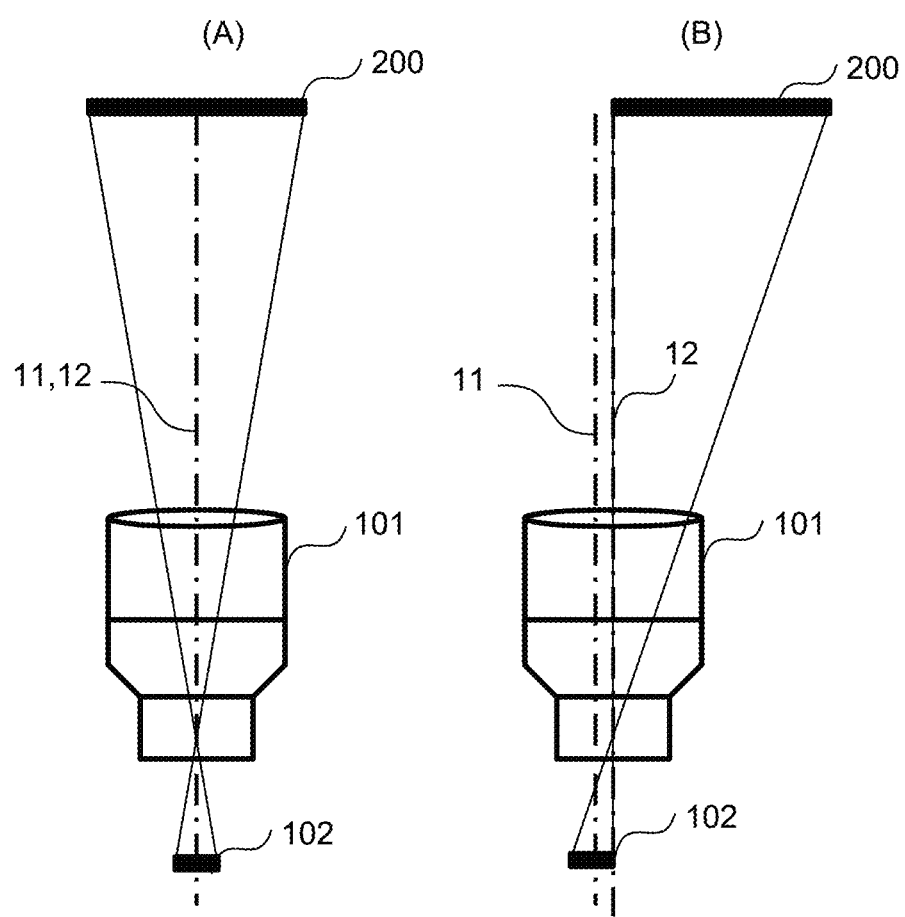
FIG. 10 is a descriptive view of an operating principle of a lens shift function to be performed by a projection lens in a second embodiment.

FIG. 10 is a descriptive view of an operating principle which is a premise of the present embodiment and in which the lens shift function is performed by a projection lens such as a middle focal length lens or a long focal length lens that projects an image onto a front screen.

In FIG. 10, (A) illustrates a state where an image is projected onto a front screen 200 when an optical axis 12 of the projection lens 101 is aligned with a central axis 11 of the display element 102 of the projection type image display apparatus. On the other hand, (B) illustrates a state where an image is projected onto the front screen 200 when the optical axis 12 of the projection lens 101 is displaced with respect to the central axis 11 of the display element 102 in a direction perpendicular to the optical axis. In that case, as illustrated in (B), the projection position of the projection image on the screen 200 is more displaced (shifted) than in (A).

In such a manner, when the optical axis 12 of the projection lens 101 is displaced (shifted) relative to the central axis 11 of the display element 102 in the direction perpendicular to the optical axis, the projection position of the projection image can be changed. At this time, changing the angle of the optical axis of the lens is not required. In the present embodiment, a lens position variable mechanism is referred to as the lens shift function.

Figure 11A:
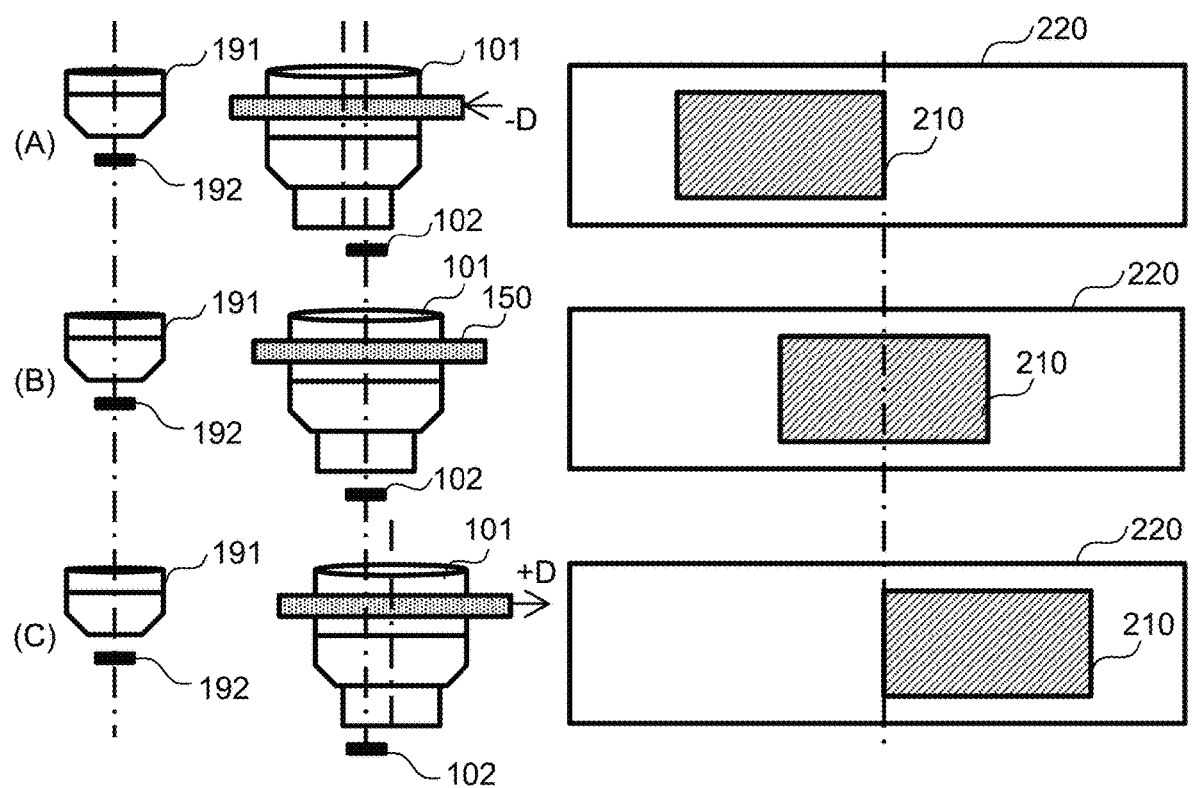
FIG. 11A is a view describing a configuration in which an imaging range includes all projection ranges caused by the lens shift function in the second embodiment.

FIG. 11A is a view describing a configuration in which an imaging range includes a projection range of a projection image at all projection positions caused by the lens shift function in the present embodiment. Namely, FIG. 11A illustrates an example in which the optical axis of the projection lens 101 is shifted from the center of the display element 102 by ±D in a horizontal direction, and (A), (B), and (C) are views illustrating a relationship between the imaging lens 191, the projection lens 101, and a projection range 210 and an imaging range 220 on the screen 200 in the cases of a shift of −D, a shift of 0, and a shift of +D, respectively.

In FIG. 11A, as an example of a shift mechanism, an example is illustrated in which the projection lens is held by a slider 150 that is displaceable in the horizontal direction. This is one example, other shift mechanisms may be used as long as being capable of shifting the optical axis of the projection lens. The projection image is shifted on the screen by approximately ±D×M at a magnification M of the projection lens.

Incidentally, the size of the projection image on the screen is M times the size of a display image on the display element because of the magnification M of the projection lens.

In FIG. 11A, the position or angle of an optical axis of the imaging lens is not changed according to a state of the lens shift function of the projection lens. Namely, the optical axis of the projection lens is shifted ±D with respect to a projection type image display apparatus body by a slide mechanism provided in the lens shift function. The relative position of the display element 102 with respect to the projection type image display apparatus body is fixed. The relative positions of the imaging lens 191 and the imaging sensor 192 relative to the projection type image display apparatus body are also fixed. Incidentally, the slider may be driven by manual rotational gears (not illustrated) or the like capable of converting a rotational torque into a displacement amount of the slider. In addition, the slider may be driven by a stepping motor, and may be controlled such that the displacement amount is electronically controlled.

As illustrated in FIG. 11A, when the lens shift function is realized by the projection lens such as a middle focal length lens or a long focal length lens that projects an image onto the front screen, the focal length of the imaging lens is set to a sufficient wide angle, so that the imaging lens has the imaging range 220 including the projection range 210 of all the projection positions caused by the lens shift function.

However, in the example of FIG. 11A, making the imaging range 220 very larger than the projection range 210 is required. For example, when an appropriate imaging range without a lens shift is assumed to be approximately 1.1 times to 1.7 times the image projection range, a shift amount of a lens shift on the screen to this range needs to be added. Hence, for example, as in the example of FIG. 11, when the configuration is such that a shift to the right and the left can be made by one screen, an imaging range that is approximately 2.1 (=1.1+1.0) times to 2.7 (=1.7+1.0) times the projection range is required, so that the imaging range becomes very large. Accordingly, a large imaging sensor is required, and an imaging lens having a wide angle needs to be prepared, so that the cost is not always reduced.

In addition, since a ratio of the projection range (interactive effective function target range) to the imaging range is small, in the case of use in the imaging sensor for the interactive function, the resolution efficiency of the imaging sensor is decreased.

Figure 11B:
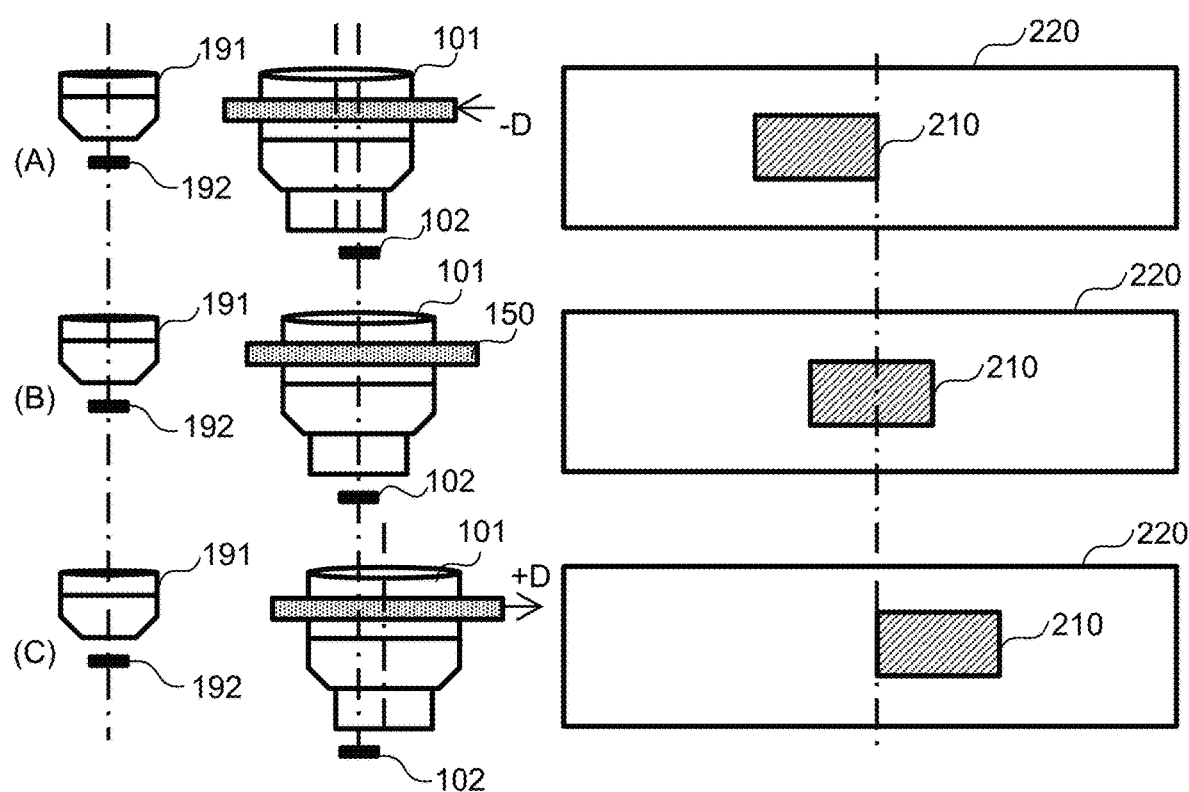
FIG. 11B is a view describing a state of usage at a telephoto side end when the projection lens is a zoom lens and when

FIG. 11B illustrates a state of usage at a telephoto side end when the projection lens is a zoom lens and when FIG. 11A illustrates setting at a wide angle side end. In FIG. 11B, the same configurations as those in FIG. 11A are denoted by the same reference signs, and a description thereof will be omitted. As illustrated in FIG. 11B, since the imaging range including the range of the projection image at all the projection positions caused by the lens shift function is already provided in FIG. 11A in which the projection lens is set at the wide angle side end, even when the projection lens is zoomed to the telephoto side end, a state is certainly maintained in which the imaging range 220 includes the projection range 210 at all the projection positions caused by the lens shift function.

However, since the ratio of the projection range 210 (interactive effective function target range) to the imaging range 220 is smaller at the telephoto side end, in the case of use in the imaging sensor for the interactive function, the resolution efficiency of the imaging sensor is further decreased. In such a manner, when the imaging range of the imaging sensor is fixed, the effective resolution efficiency of the imaging sensor is more decreased when the projection lens is set at the telephoto side end than at the wide angle side end.

Figure 11C:
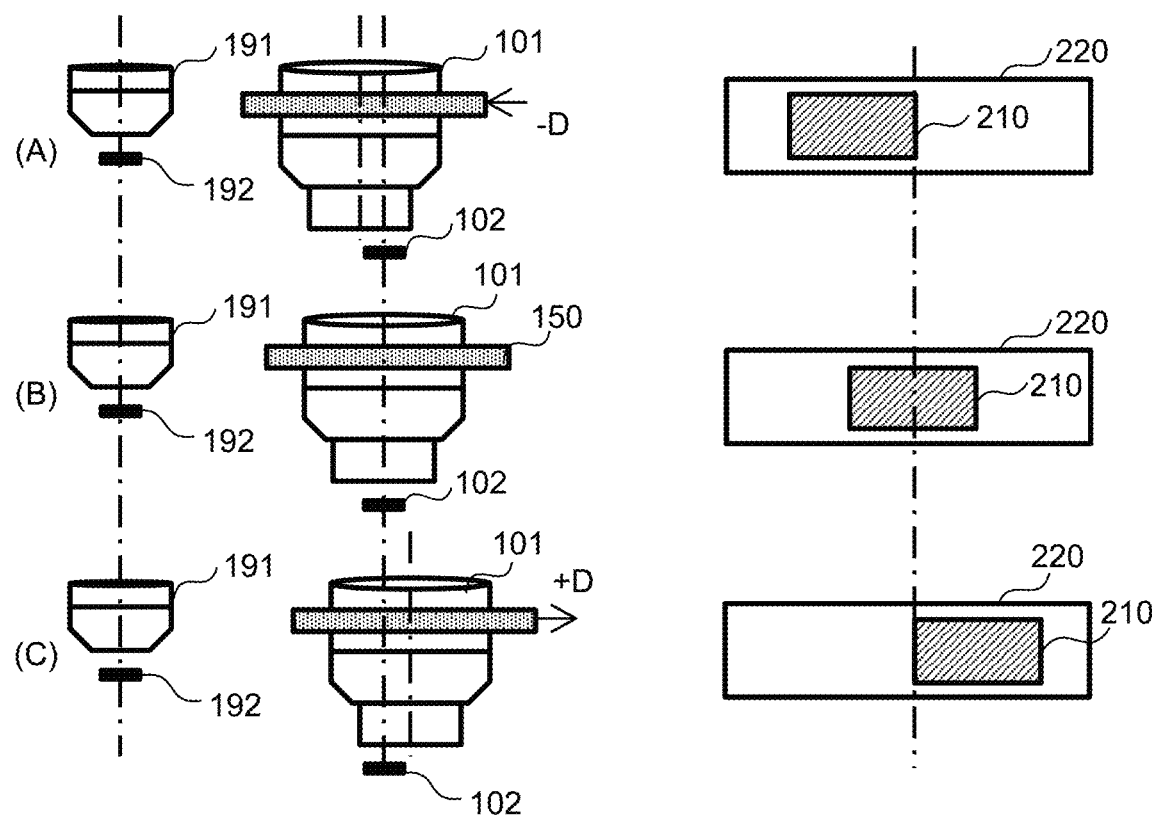
FIG. 11C is a view describing a configuration in which when the projection lens is a zoom lens, the imaging lens is also a zoom lens and the zooming of the imaging lens is adjusted according to the zooming of the projection lens in the second embodiment.

Therefore, as in FIG. 11C, the imaging lens may also be a zoom lens, and the zooming of the imaging lens may be adjusted according to the zooming of the projection lens. FIG. 11C illustrates an example in which the zooming of the projection lens is in a state of the telephoto side end and the zooming of the imaging lens is also in a state of the telephoto side end. In FIG. 11C, the same configurations as those in FIG. 11B are denoted by the same reference signs, and a description thereof will be omitted.

As illustrated in FIG. 11C, when the zooming of the imaging lens and the zooming of the projection lens are changed at the same ratio, the effective resolution efficiency of the imaging sensor is more improved than in the example of FIG. 11B, and is the same as that in the example of FIG. 11A.

Similarly to the zooming of the projection lens, the zooming of the imaging lens may be performed manually or automatically. In the automatic zooming, the zooming of the imaging lens may be controlled in conjunction with the zooming of the projection lens. In the manual zooming, a user or an installer may manually adjust the zooming to an appropriate position.

In the examples of FIGS. 11A to 11C, in order to simplify description, an example has been described in which only a lens shift in the horizontal direction is performed; however, the concept of the examples of FIGS. 11A to 11C can also be applied to a case where a lens shift in a vertical direction is performed, and also to a case where a lens shift in two directions, specifically, the horizontal direction and the vertical direction is performed.

Figure 12A:
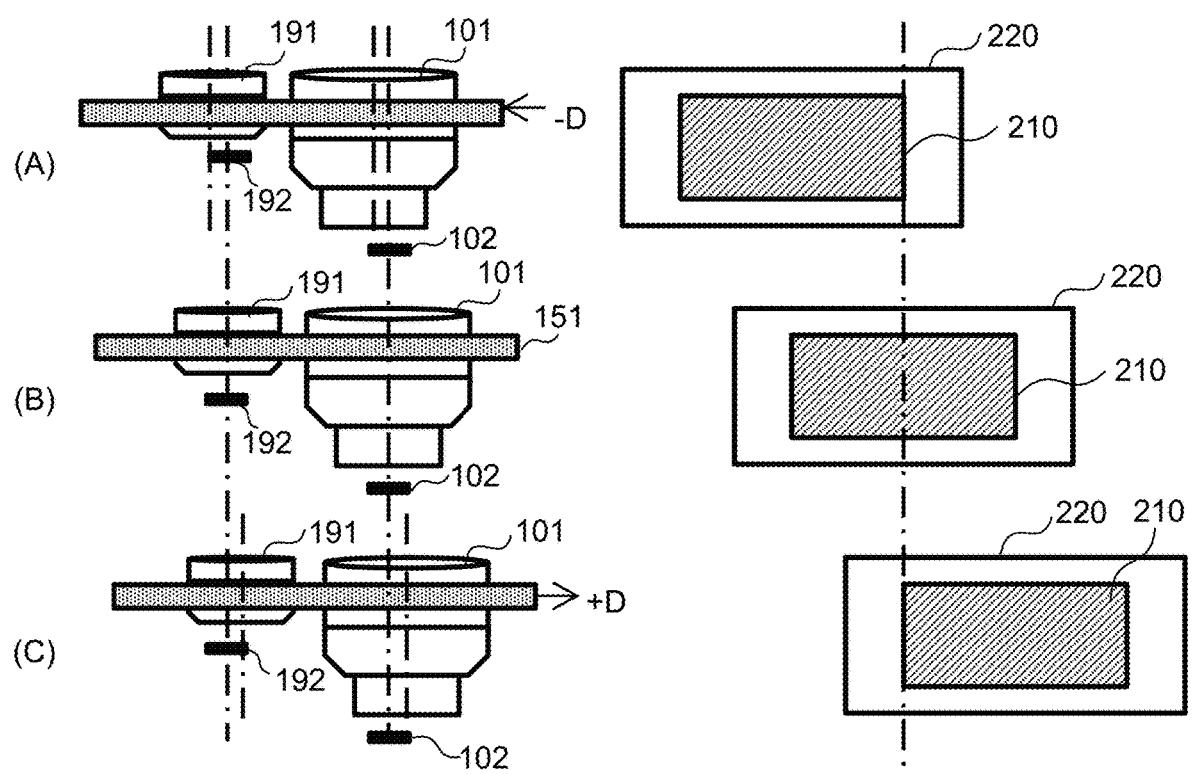
FIG. 12A is a view describing a configuration in which a lens shift is performed in a state where a projection lens and an imaging lens are in conjunction with each other in the second embodiment.

FIG. 12A is a view describing a configuration in which a lens shift is performed in a state where a projection lens and an imaging lens are in conjunction with each other when the lens shift function is realized by the projection lens such as a middle focal length lens or a long focal length lens that projects an image onto a front screen. In FIG. 12A, the same configurations as those in FIG. 11A are denoted by the same reference signs, and a description thereof will be omitted. In FIG. 12A, a lens shift is performed in a state where the projection lens 101 and the imaging lens 191 are in conjunction with each other. Specifically, the optical axis of the projection lens is shifted from the center of the display element by ±D in the horizontal direction. At the same time, the optical axis of the imaging lens is shifted with respect to the center of the imaging sensor by the same amount in the horizontal direction.

In FIG. 12A, as a shift mechanism, an example of a slide mechanism is illustrated in which both the projection lens 101 and the imaging lens 191 are held by a slider 151 that is displaceable in the horizontal direction. This is one example, and other shift mechanisms may be used as long as being capable of performing a shift. In such a manner, shift amounts of the projection lens 101 and the imaging lens 191 are always the same. In FIG. 12A, the slide mechanism provided in the lens shift function shifts the optical axis of the projection lens 101 and the optical axis of the imaging lens 191 with respect to the projection type image display apparatus body by ±D. The relative positions of the display element 102 and the imaging sensor 192 with respect to the projection type image display apparatus body are fixed. Incidentally, the slider 151 may be driven by manual rotational gears (not illustrated) or the like capable of converting a rotational torque into a displacement amount of the slider. In addition, the slider may be driven by a stepping motor, and may be controlled such that the displacement amount is electronically controlled.

Here, the size of the projection image on the screen is M times the size of a display image on the display element because of the magnification M of the projection lens. Here, for example, as illustrated in FIG. 12A, the imaging range 220 caused by the imaging lens is set to a size to include the entirety of the projection range 210 of the projection image on the screen and to secure a predetermined margin. For example, it is desirable that the imaging range is approximately 1.1 times to 1.7 times the projection range. Further, a margin may be provided, and when the imaging sensor is used for the interactive function, since a ratio of the projection range (interactive effective function target range) to the imaging range is small, it is more efficient to set the imaging range to approximately 2 times the projection range in consideration of the effective resolution efficiency of the imaging sensor.

In the configuration of FIG. 12A, since the shift amounts of the optical axis of the projection lens and of the optical axis of the imaging lens by the shift mechanism are the same, as illustrated in FIG. 12A, in order to perform a shift while the projection range 210 is included in the imaging range 220 on the screen, it is preferable that a magnification of the imaging range 220 is also set to the same M as the magnification (magnification at a wide angle end in the case of a zoom lens) of the projection lens. Then, when the magnification of the imaging lens and the magnification of the projection lens are the same, a relationship between the projection range and the imaging range on the screen is proportional to the size of the imaging range of the imaging sensor and the size of a display range on the display element. Therefore, when the imaging range caused by the imaging lens is set to 1.1 times to 1.7 times the projection range on the screen, a combination of an imaging sensor and a display element may be determined such that the size of an imaging range of the imaging sensor and the size of a display range on the display element are also approximately 1.1 times to 1.7 times the projection range in the same manner.

When the imaging lens, the imaging sensor, the projection lens, the display element, and the shift mechanism are configured in such a manner, the projection image is shifted on the screen by approximately ±D×M because of the magnification M of the projection lens. Similarly, the imaging range is shifted on the screen by approximately ±D×M because of the magnification M of the imaging lens.

Incidentally, in the configuration of FIG. 12A, a larger imaging sensor is required and an imaging lens having a wider angle needs to be prepared than when the relative positions of the imaging lens and the imaging sensor with respect to the projection type image display apparatus body are fixed, so that the cost is not always reduced.

In addition, since the ratio of the image projection range (interactive effective function target range) to the imaging range is small, in the case of use in the imaging sensor for the interactive function, the resolution efficiency of the imaging sensor is decreased.

Figure 12B:
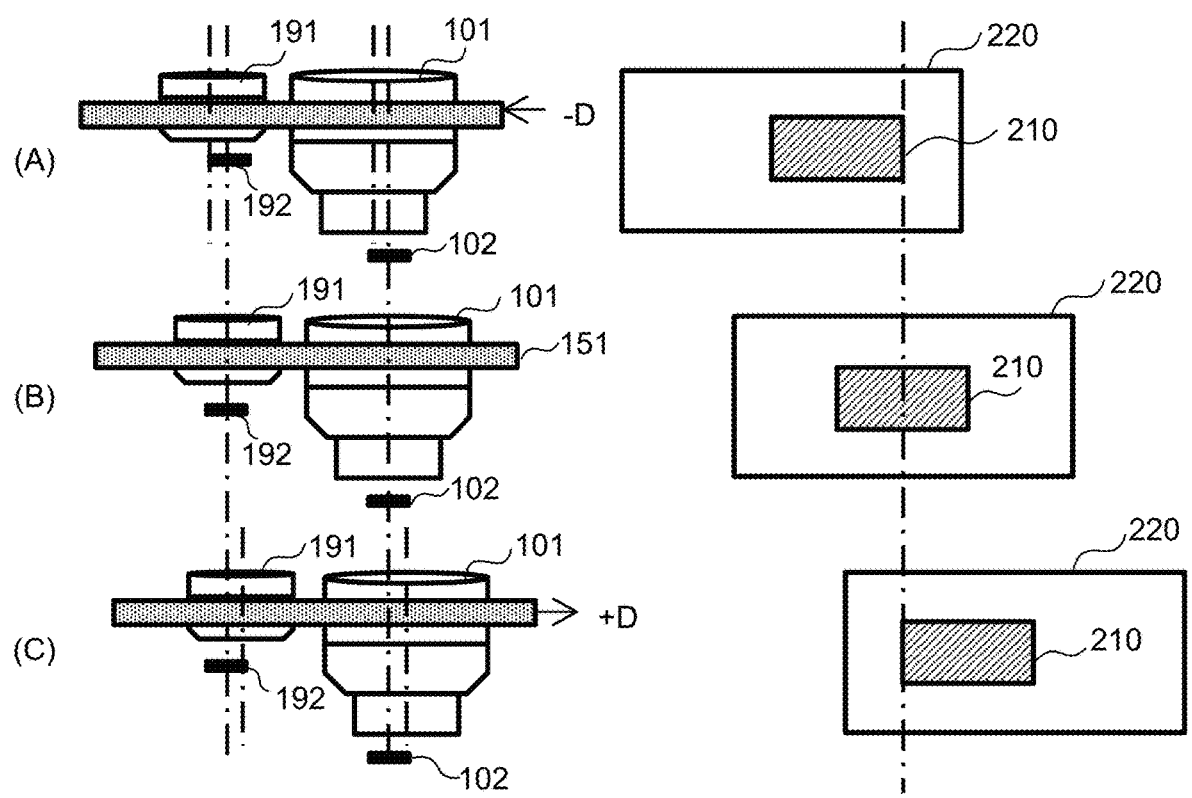
FIG. 12B is a view describing a configuration in which a lens shift is performed in a state where a projection lens and an imaging lens are in conjunction with each other when the projection lens is a zoom lens in the second embodiment.

FIG. 12B illustrates a state of usage at a telephoto side end when the projection lens is a zoom lens and when FIG. 12A illustrates setting at a wide angle side end. In FIG. 12B, the same configurations as those in FIG. 12A are denoted by the same reference signs, and a description thereof will be omitted. As illustrated in FIG. 12B, since the imaging range including the range of the projection image at all projection positions is already provided in FIG. 12A in which the projection lens is set at the wide angle side end, even when the projection lens is zoomed to the telephoto side end, a state is certainly maintained in which the imaging range 220 includes the projection range 210 of the projection image at all the projection positions caused by the lens shift function.

However, since the ratio of the projection range 210 (interactive effective function target range) to the imaging range 220 is smaller at the telephoto side end, in the case of use in the imaging sensor for the interactive function, the resolution efficiency of the imaging sensor is relatively decreased. Namely, the effective resolution efficiency of the imaging sensor is more decreased when the projection lens is set at the telephoto side end than at the wide angle side end.

Figure 12C:
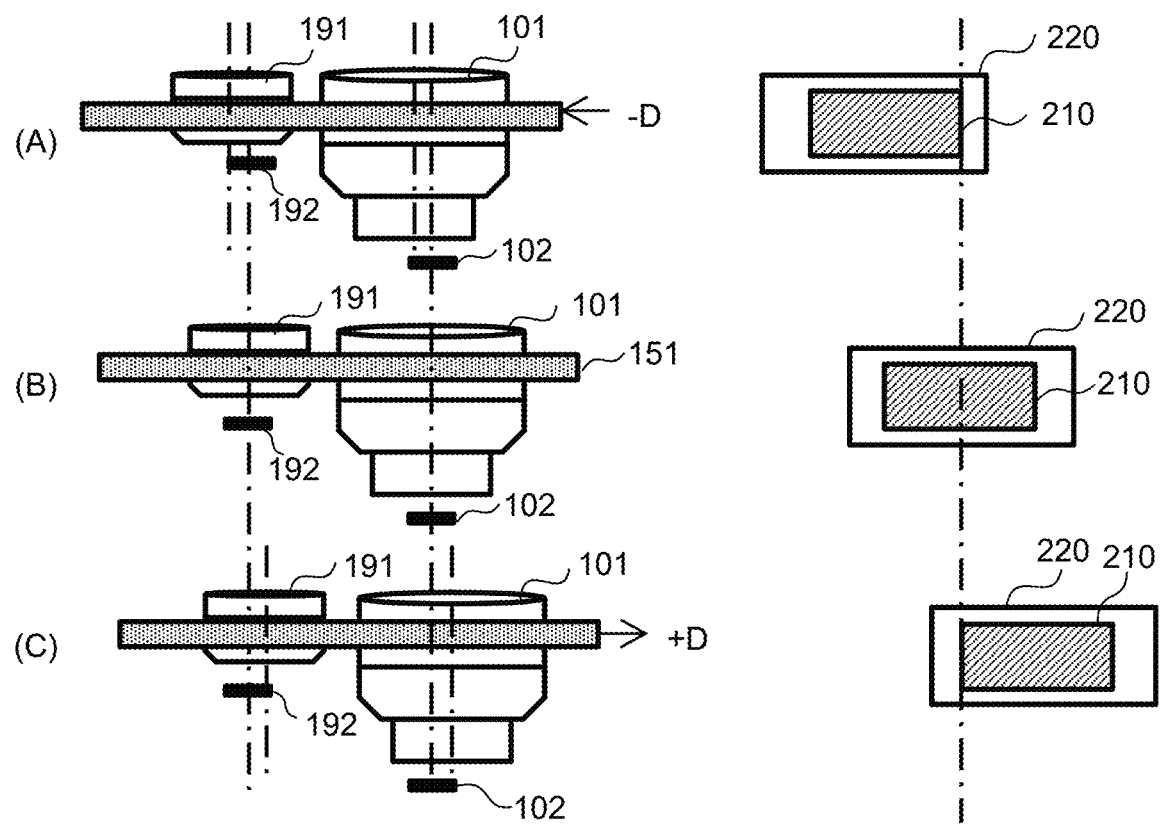
FIG. 12C is a view describing a configuration in which when the projection lens is a zoom lens, the imaging lens is also a zoom lens and a lens shift is performed in a state where the projection lens and the imaging lens are in conjunction with each other in the second embodiment.

Therefore, as in FIG. 12C, the imaging lens 191 may also be a zoom lens, and the zooming of the imaging lens may be adjusted according to the zooming of the projection lens 101. FIG. 12C illustrates an example in which the zooming of the projection lens is in a state of the telephoto side end and the zooming of the imaging lens is also in a state of the telephoto side end. In FIG. 12C, the same configurations as those in FIG. 12B are denoted by the same reference signs, and a description thereof will be omitted. As illustrated in FIG. 12C, the effective resolution efficiency of the imaging sensor is more improved than in the example of FIG. 12B, and is the same as that in the example of FIG. 12A.

Similarly to the zooming of the projection lens, the zooming of the imaging lens may be performed manually or automatically. In the automatic zooming, the zooming of the imaging lens may be controlled in conjunction with the zooming of the projection lens. In the manual zooming, a user or an installer may manually adjust the zooming to an appropriate position.

In the examples of FIGS. 12A to 12C, in order to simplify description, an example has been described in which only a lens shift in the horizontal direction is performed; however, the concept of the examples of FIGS. 12A to 12C can also be applied to a case where a lens shift in the vertical direction is performed, and to a case where a lens shift in two directions, specifically, the horizontal direction and the vertical direction is performed.

In addition, in FIGS. 12A to 12C, the imaging sensor may be moved in a reverse direction instead of moving the optical axis of the imaging lens in the direction perpendicular to the optical axis. Namely, since a relative position between the imaging sensor and the imaging lens may be changed, a position variable mechanism may be provided which changes the relative position between the imaging sensor that receives light passing through the imaging lens and the imaging lens in conjunction with a displacement of the projection lens. In that case, a change amount by which the relative position is changed by the position variable mechanism is equal to a displacement amount of the projection lens.

In addition, the configuration examples of FIGS. 12A to 12C can be adopted in the configuration (configuration in which the projection lens and the imaging lens (or camera unit) are configured as an integrated lens unit and are attached and detached by way of a lens unit) described with reference to FIG. 8. Namely, the slider and various mechanisms for the lens shift function described with reference to FIGS. 12A to 12C may be included in the lens unit illustrated in FIG. 8.

In the example of FIG. 12A, an example has been described in which the shift mechanism that sets the shift amounts of the optical axis of the projection lens and of the optical axis of the imaging lens to be the same is used when the lens shift function is realized by the projection lens such as a middle focal length lens or a long focal length lens that projects an image onto the front screen. However, since the shift amounts of the optical axis of the projection lens and of the optical axis of the imaging lens are set to be the same, the setting of the magnification (maximum magnification in the case of a zoom lens) of the projection lens and the magnification (maximum magnification in the case of a zoom lens) of the imaging lens to be substantially the same is required. In addition, since the imaging range caused by the imaging lens needs to include the entirety of the projection range on the screen, there is a limitation that an imaging sensor smaller than the display element cannot be used. When the imaging sensor cannot be reduced in size, the imaging lens cannot also be reduced in size.

Figure 13A:
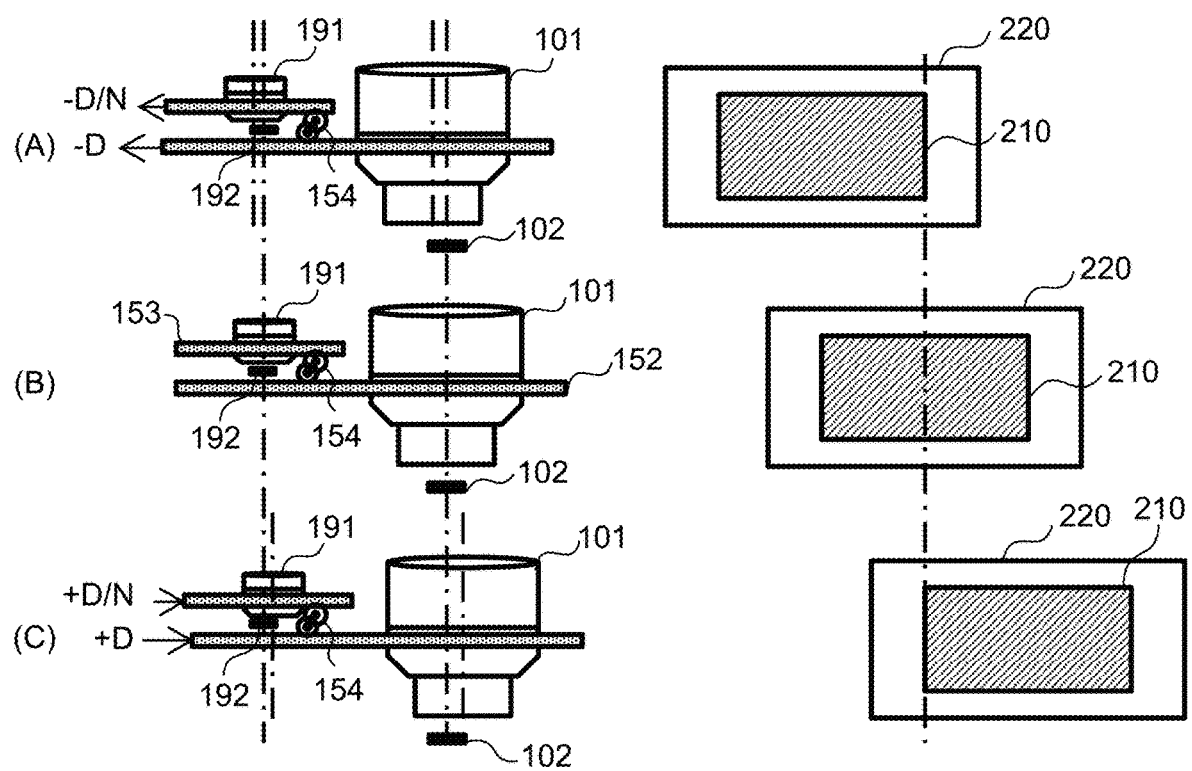
FIG. 13A is a view describing a configuration in which a lens shift is performed in magnification of a shift amount in a state where a projection lens and an imaging lens are in conjunction with each other in the second embodiment.

Therefore, a configuration of FIG. 13A is used to realize a reduction in the size of the imaging sensor and the imaging lens while realizing the function of the configuration of FIG. 12A. In FIG. 13A, the same configurations as those in FIG. 12A are denoted by the same reference signs, and a description thereof will be omitted.

In FIG. 13A, a lens shift function is provided which magnifies a shift amount of an optical axis of an imaging lens with respect to a shift amount of an optical axis of a projection lens when a lens shift is performed such that the optical axis of the projection lens and the optical axis of the imaging lens are shifted in conjunction with each other.

Specifically, in FIG. 13A, the optical axis of the projection lens 101 is shifted from the center of the display element 102 by ±D in the horizontal direction, and at the same time, the optical axis of the imaging lens 191 is shifted from the center of the imaging sensor 192 by ±D/N in the horizontal direction. Namely, a shift amount of the optical axis of the imaging lens 191 is 1/N times a shift amount of the optical axis of the projection lens 101.

In FIG. 13A, for example, the following configuration is provided as a shift mechanism that realizes a conversion of 1/N times a displacement amount. Namely, a first slider 152 capable of displacing the position of the optical axis of the projection lens in the horizontal direction and a second slider 153 capable of displacing the position of the optical axis of the imaging lens in the horizontal direction are prepared, and a plurality of gears forming a rack and pinion mechanism that links a displacement of each of the sliders with the rotation of the gears are provided, and the plurality of gears are related to a transmission gear 154 Incidentally, at least one of the sliders may be driven by manual rotational gears (not illustrated) or the like capable of converting a rotational torque into a displacement amount of the slider. In addition, at least one of the sliders may be driven by a stepping motor, and may be controlled such that the displacement amount is electronically controlled. Since there are various known techniques as a configuration of the transmission gear 154 using the plurality of gears, and these techniques may be used, a detailed description of the configuration will be omitted.

Incidentally, the above configuration is one example, and other shift mechanisms may be used as long as capable of performing a shift to realize a conversion of 1/N times a displacement amount. For example, each of two sliders may be driven by a stepping motor without providing the above-described transmission gear, and may be controlled such that the displacement amount is electronically controlled to cause the shift amount of the optical axis of the imaging lens to be always 1/N times the shift amount of the optical axis of the projection lens.

In the configuration of FIG. 13A, the above-described slide mechanism provided in a lens shift mechanism shifts the optical axis of the projection lens with respect to the projection type image display apparatus body by ±D. The optical axis of the imaging lens is shifted with respect to the projection type image display apparatus body by ±D/N. The relative positions of the display element and the imaging sensor with respect to the projection type image display apparatus body are fixed.

Here, when the magnification of the projection lens is set to the same M as that in FIG. 12A, an imaging sensor having a size that is 1/N times the size (1/N squared size in area) in FIG. 12A in a length direction is used, and the magnification of the imaging lens is set to M×N, a relationship between the projection range and the imaging range on the screen is the same as that in FIG. 12A. Here, the size of the imaging lens can be reduced as the size of the imaging sensor is further reduced. For this reason, in the configuration of FIG. 13A, the imaging sensor has a size that is 1/N times the size in the case of FIG. 12A in the length direction, so that a more reduction in the size of the imaging lens in FIG. 13A than in that of the imaging lens of FIG. 12A can be realized. The smaller both the imaging lens and the imaging sensor are, the lower the production cost can be, and hence, the configuration of FIG. 13A can be realized at a lower cost than the configuration of FIG. 12A.

In the configuration of FIG. 13A, since the imaging lens, the imaging sensor, the projection lens, the display element, and the shift mechanism are configured as described above, when the shift amount of the optical axis of the projection lens is ±D, the projection image is shifted on the screen by approximately ±D×M because of the magnification M of the projection lens. Similarly, the shift amount of the optical axis of the imaging lens ±D/N, and the imaging range is shifted on the screen by approximately ±D×M because of a magnification M×N of the imaging lens.

Since a concept of securing a margin of the imaging range on the screen with respect to the projection range on the screen is the same as that in the case of FIG. 12A, a description thereof will be omitted. In any case, the size of the imaging sensor may be 1/N times the size in the case of FIG. 12A.

As described above, in the configuration of FIG. 13A, since the shift amount of the optical axis of the imaging lens is set to always 1/N times the shift amount of the optical axis of the projection lens, the imaging lens and the imaging sensor can be further reduced, and the cost can be further reduced while obtaining the same effects as those in the case of FIG. 12A.

Figure 13B:
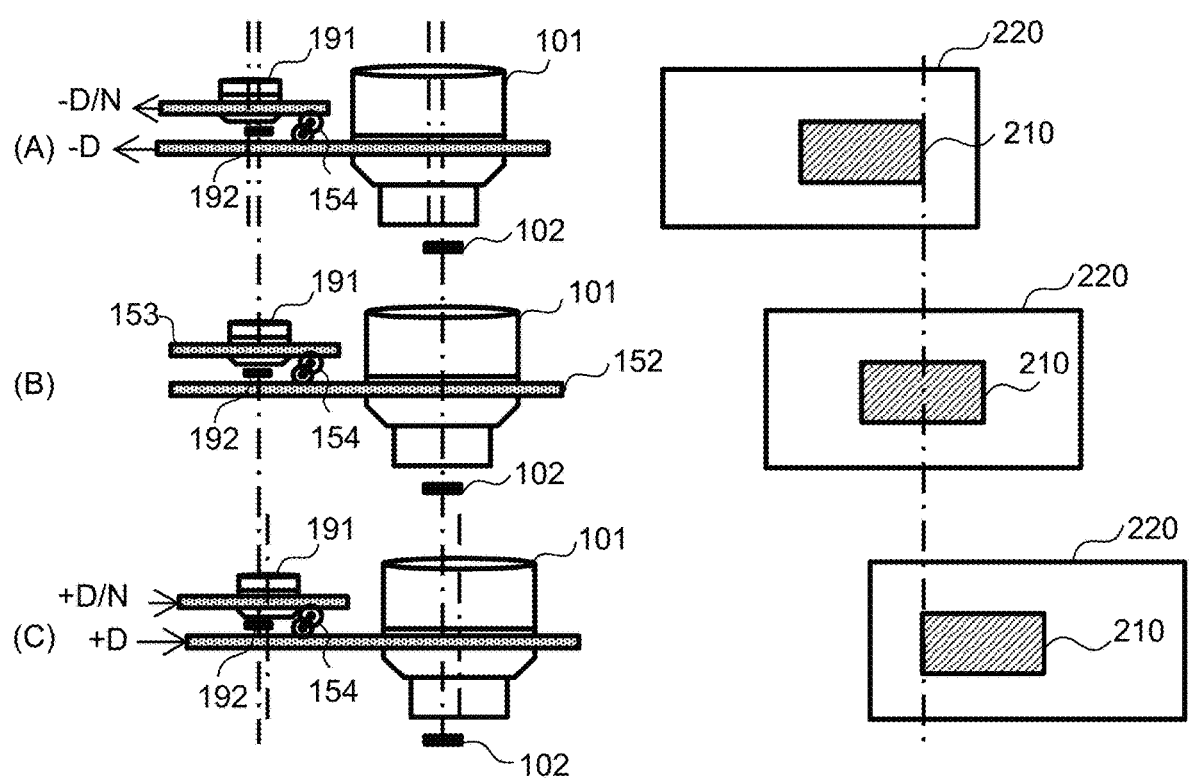
FIG. 13B is a view describing a configuration in which when the projection lens is a zoom lens, a lens shift is performed in magnification of a shift amount in a state where the projection lens and an imaging lens are in conjunction with each other in the second embodiment.

FIG. 13B illustrates a state of usage at a telephoto side end when the projection lens is a zoom lens and when FIG. 13A illustrates setting at a wide angle side end. In FIG. 13B, the same configurations as those in FIG. 13A are denoted by the same reference signs, and a description thereof will be omitted. As illustrated in FIG. 13B, since the imaging range including the range of the projection image at all projection positions is already provided in FIG. 13A in which the projection lens is set at the wide angle side end, even when the projection lens 101 is zoomed to the telephoto side end, a state is certainly maintained in which the imaging range 220 includes the projection range 210 at all the projection positions caused by the lens shift function. However, since the ratio of the projection range (interactive effective function target range) to the imaging range is smaller at the telephoto side end, in the case of use in the imaging sensor for the interactive function, the resolution efficiency of the imaging sensor is relatively decreased. Namely, the effective resolution efficiency of the imaging sensor is more decreased when the projection lens is set at the telephoto side end than at the wide angle side end.

Figure 13C:
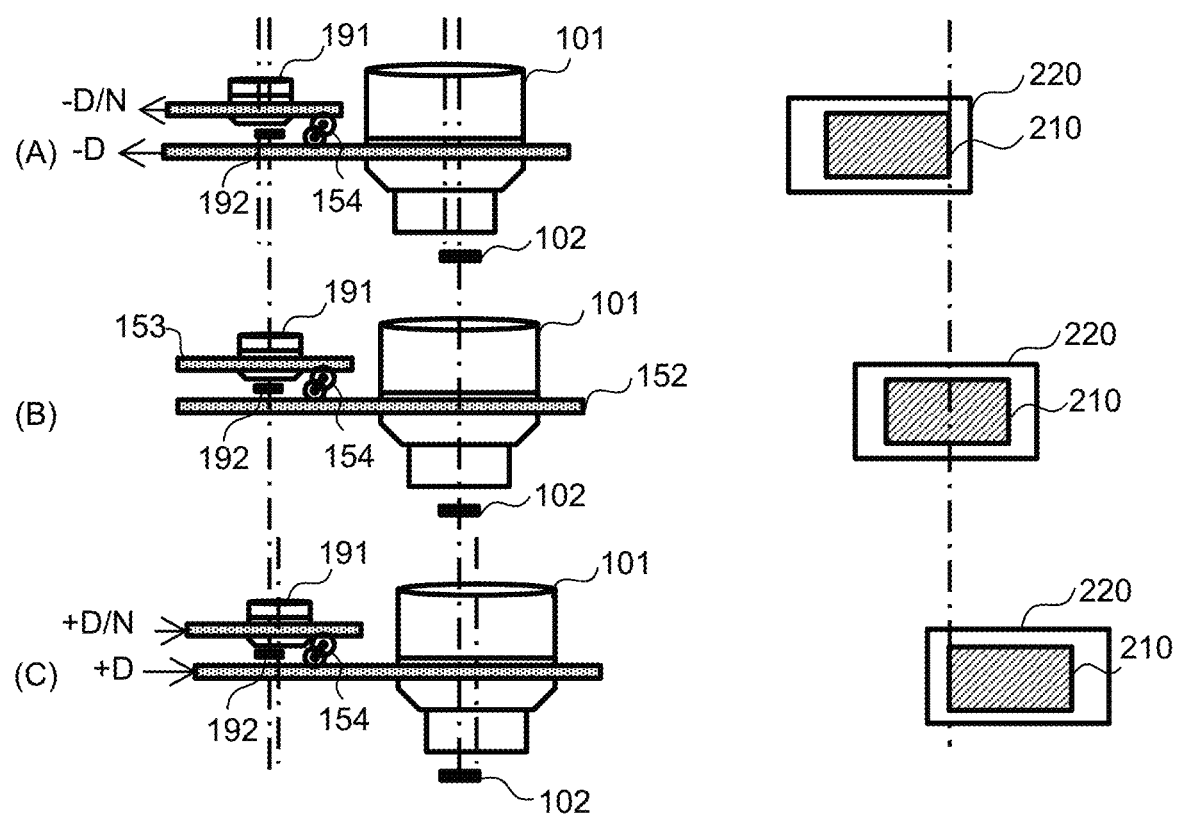
FIG. 13C is a view describing a configuration in which when the projection lens is a zoom lens, the imaging lens is also a zoom lens and a lens shift is performed in magnification of a shift amount in a state where the projection lens and the imaging lens are in conjunction with each other in the second embodiment.

Therefore, as in FIG. 13C, the imaging lens 191 may also be a zoom lens, and the zooming of the imaging lens may be adjusted according to the zooming of the projection lens 101. In FIG. 13C, the same configurations as those in FIG. 13B are denoted by the same reference signs, and a description thereof will be omitted. FIG. 13C illustrates an example in which the zooming of the projection lens is in a state of the telephoto side end and the zooming of the imaging lens is also in a state of the telephoto side end. Accordingly, the effective resolution efficiency of the imaging sensor is more improved than in the case of FIG. 13B, and is the same as that in the case of FIG. 13A.

Similarly to the zooming of the projection lens, the zooming of the imaging lens may be performed manually or automatically. In the automatic zooming, the zooming of the imaging lens may be controlled in conjunction with the zooming of the projection lens. In the manual zooming, a user or an installer may manually adjust the zooming to an appropriate position.

In FIGS. 13A to 13C, in order to simplify description, an example has been described in which only a lens shift in the horizontal direction is performed; however, the concept of FIGS. 13A to 13C can also be applied to a case where a lens shift in the vertical direction is performed, and to a case where a lens shift in two directions, specifically, the horizontal direction and the vertical direction is performed.

In addition, in FIGS. 13A to 13C, the imaging sensor may be moved instead of moving the optical axis of the imaging lens. Namely, since a relative position between the imaging sensor and the imaging lens may be changed, a position variable mechanism may be provided which changes the relative position between the imaging sensor that receives light passing through the imaging lens and the imaging lens in conjunction with a displacement of the projection lens. In that case, a change amount by which the relative position is changed by the position variable mechanism is set to 1/N times a displacement amount of the projection lens.

In addition, the configuration examples of FIGS. 13A to 13C can be adopted in the configuration (configuration in which the projection lens and the imaging lens (or camera unit) are configured as an integrated lens unit and are attached and detached by way of a lens unit) described with reference to FIG. 8. Namely, the slider and various mechanisms for the lens shift function described with reference to FIGS. 13A to 13C may be included in the lens unit illustrated in FIG. 8.

Incidentally, in the configuration examples of FIGS. 13A to 13C, an example has been described in which the imaging sensor is disposed between two sliders. However, a disposition example of the imaging sensor is not limited thereto. For example, an opening that does not interfere with optical imaging may be provided in one of two sliders, and the imaging sensor may be disposed outside the two sliders.

Figure 14A:
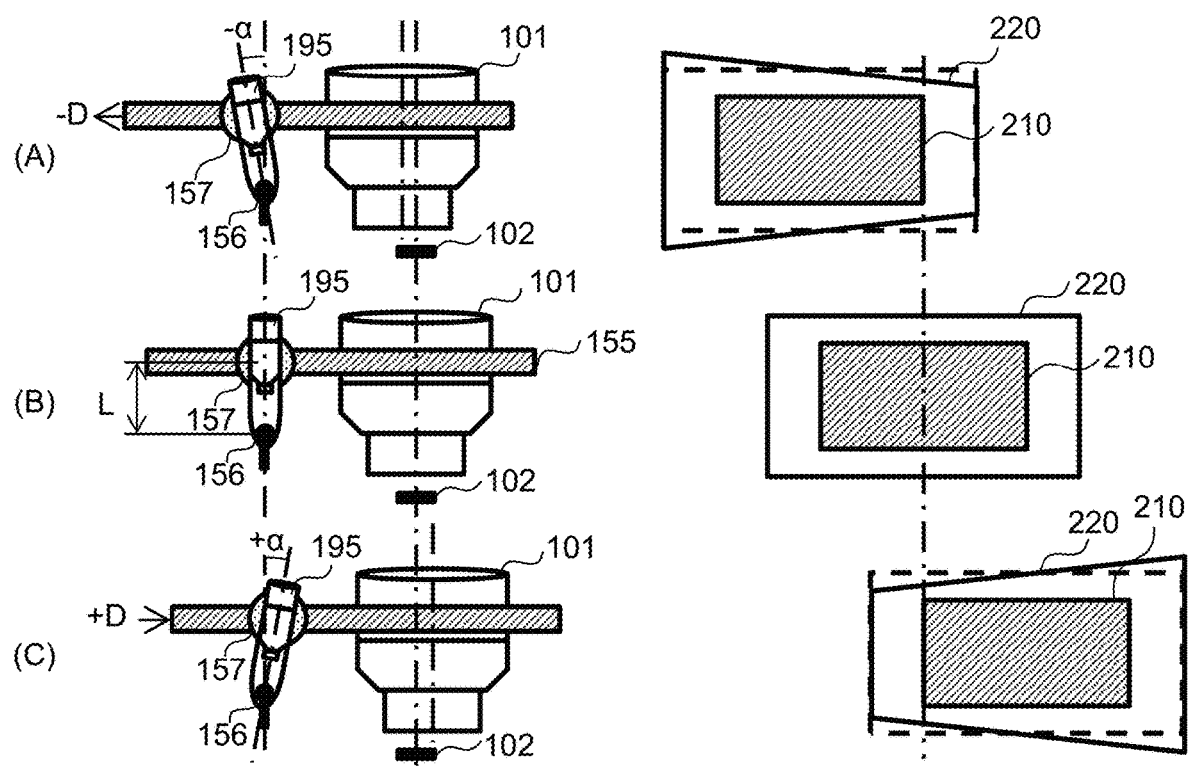
FIG. 14A is a view describing a configuration in which a lens shift is performed in a state where a shift of the position of an optical axis of a projection lens and a conversion of an angle of an optical axis of an imaging camera are in conjunction with each other in the second embodiment.

FIG. 14A is a view describing another example in which an imaging sensor and an imaging lens are reduced in size and in cost while realizing the function of the configuration of the FIG. 13A. In FIG. 14A, the same configurations as those in FIG. 13A are denoted by the same reference signs, and a description thereof will be omitted. In FIG. 14A, a shift mechanism is used by which the angle of an imaging camera including an imaging sensor and an imaging lens is variable by ±α° in the horizontal direction in conjunction with a shift of an optical axis of a projection lens when the optical axis of the projection lens is shifted by ±D in the horizontal direction using a slider. Namely, an optical axis of the imaging lens is variable by ±α°.

Specifically, as illustrated in FIG. 14A, an imaging camera 195 and a member fixed to the projection type image display apparatus body are connected to each other by, for example, a universal joint such as a ball joint. Then, the imaging camera 195 is configured such that the angle of the imaging camera 195 can be changed using the ball joint as a fulcrum 156. Further, a connection portion 157 between a slider 155 and the imaging camera 195 is provided at a position closer to an image projection direction than the fulcrum 156, and the connection portion 157 is configured as, for example, a ball bearing joint. A barrel of the imaging camera 195 is slidable on the ball joint bearing. With such a configuration, when the optical axis of the projection lens is shifted by ±D in the horizontal direction using the slider 155, the angle of the imaging camera 195 including the imaging sensor and the imaging lens can be variable in conjunction with the shift. The connection portion 157 and the ball joint bearing may be referred to as a displacement-to-angle conversion mechanism.

In FIG. 14A, the above slide mechanism provided in a lens shift mechanism shifts the optical axis of the projection lens 101 with respect to the projection type image display apparatus body by ±D. The relative position of the display element 102 with respect to the projection type image display apparatus body is fixed. The angle of the optical axis of the imaging lens is variable by ta with respect to the optical axis of the projection lens. The imaging sensor rotates in conjunction with the variability of the optical axis of the imaging lens. Namely, the relative position of the imaging sensor with respect to the imaging lens is not changed, and the angle of the entirety of the imaging camera 195 including the imaging lens and the imaging sensor is variable by to with respect to the optical axis of the projection lens 101. The angle of the entirety of the imaging camera 195 may be expressed as being variable by to from a predetermined installation direction of the projection type image display apparatus (for example, front direction of the projection type image display apparatus).

Incidentally, the slider 155 of the lens shift mechanism of FIG. 14A may be driven by manual rotational gears (not illustrated) or the like capable of converting a rotational torque into a displacement amount of the slider. In addition, the slider 155 may be driven by a motor such as a stepping motor, and may be controlled such that the displacement amount is electronically controlled. When the slider 155 is driven by a motor such as a stepping motor, the changing of the angle of the imaging camera may also be driven by the motor such as a stepping motor, and the imaging camera may be controlled such that a displacement of the slider 155 and a change in the angle of the imaging camera 195 are in conjunction with each other.

In the configuration of FIG. 14A, since the imaging camera 195 is used in a state where the angle of the entirety of the imaging camera 195 including the imaging sensor and the imaging lens is changed to an angle that is not perpendicular to the screen, as illustrated in the drawing, the imaging range 220 of the imaging lens has a shape that is distorted to a trapezoidal shape on the screen. Therefore, when the projection range 210 is recognized using the imaging camera 195, a geometric transformation correction process needs to be performed. Since there are various known techniques as a method for capturing an image of the screen including such a projection image, correcting a distortion of the captured projection range, and recognizing the corrected projection range as a rectangular projection range, and these techniques may be used, a description thereof will be omitted. Specifically, after the projection type image display apparatus is installed and the position of the projection lens of the shift mechanism is fixed at a desired position, a technique of capturing an image of a projected test pattern and performing a calibration may be used.

Incidentally, a variable rotational angle α may be appropriately determined according to the magnification of the imaging lens, the shift amount ±D of the projection lens, the size of the display element, and the magnification (magnification at a wide angle end in the case of a zoom lens) of the projection lens such that the projection range of the projection lens on the screen is always included in the imaging range of the imaging lens. In order to set the variable rotational angle α to a predetermined angle while the shift amount of the slider is fixed to ±D, the setting of a distance L in an optical axis direction of the projection lens between the fulcrum (universal joint that connects the imaging camera and the member fixed to the projection type image display apparatus body) and the connection portion (ball joint bearing) that connects the slider and the barrel of the imaging camera may be appropriately changed.

In the configuration of FIG. 14A, in order to realize the configuration in which the projection range of the projection lens on the screen is always included in the imaging range of the imaging lens, two points, such as setting the variable rotational angle α appropriately, and the imaging range on the screen after being subjected to a trapezoidal distortion on the screen including the projection range, may be satisfied. The former point is determined by the setting (first setting) of the shift amount ±D of the projection lens, and of the distance L. The latter point is determined by the setting (second setting) of the magnification of the imaging sensor and of the magnification of the imaging lens. Since the first setting and the second setting can be set independently of each other, the size of the imaging sensor and the magnification of the imaging lens can be relatively freely set as long as being within realistic ranges. Accordingly, a smaller imaging sensor can be used and a lower cost can be realized than in the examples of FIGS. 11A to 11C and in the examples of FIGS. 12A to 12C.

As described above, when the shift mechanism is used in which a shift of the position of the optical axis of the projection lens and a conversion of the angle of an optical axis of the imaging camera are in conjunction with each other, similarly to the examples of FIGS. 13A to 13C, a smaller imaging sensor can be used and a lower cost can be realized than in the examples of FIGS. 12A to 12C.

Figure 14B:
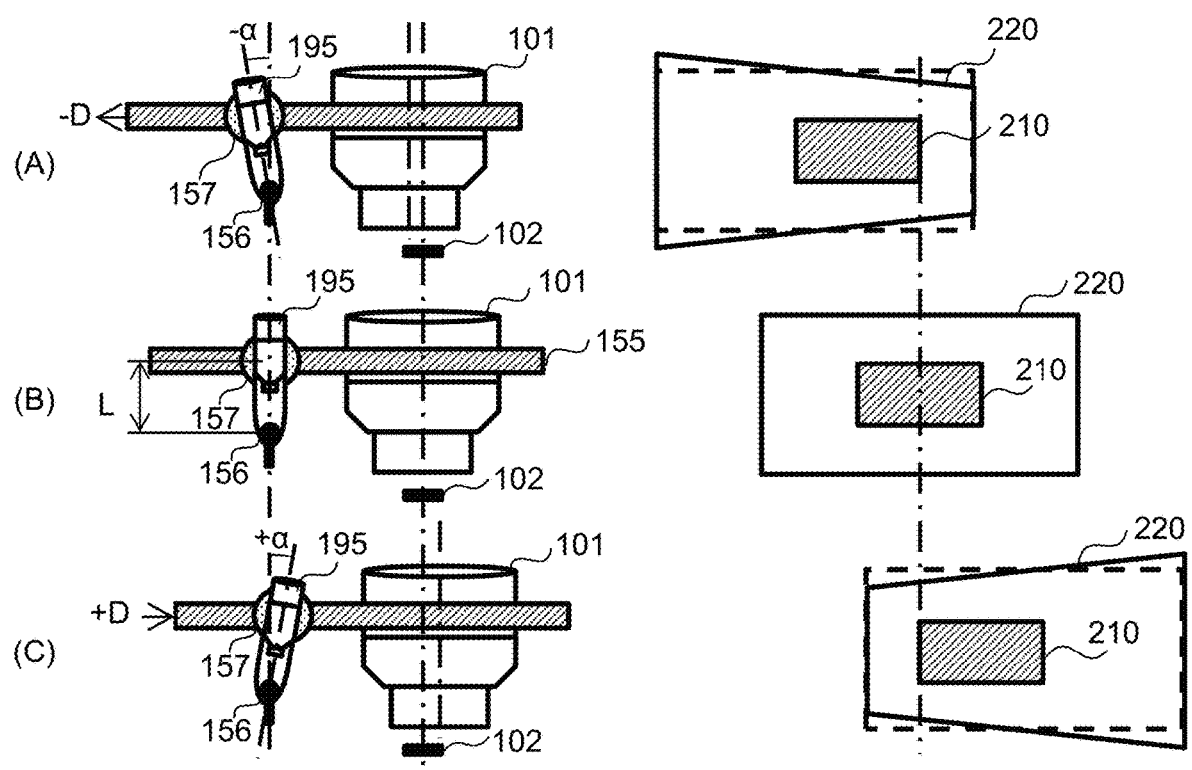
FIG. 14B is a view describing a configuration in which when the projection lens is a zoom lens, a lens shift is performed in a state where a shift of the position of an optical axis of the projection lens and a conversion of an angle of an optical axis of an imaging camera are in conjunction with each other in the second embodiment.

FIG. 14B illustrates a state of usage at a telephoto side end when the projection lens is a zoom lens and when FIG. 14A illustrates setting at a wide angle side end. In FIG. 14B, the same configurations as those in FIG. 14A are denoted by the same reference signs, and a description thereof will be omitted. As illustrated in FIG. 14B, since the imaging range 220 including the projection range 210 at all projection positions is already provided in FIG. 14A in which the projection lens is set at the wide angle side end, even when the projection lens 101 is zoomed to the telephoto side end, a state is certainly maintained in which the imaging range 220 includes the projection range 210 at all the projection positions caused by the lens shift function. However, since the ratio of the projection range (interactive effective function target range) to the imaging range is smaller at the telephoto side end, in the case of use in the imaging sensor for the interactive function, the resolution efficiency of the imaging sensor is relatively decreased. Namely, the effective resolution efficiency of the imaging sensor is more decreased when the projection lens is set at the telephoto side end than at the wide angle side end.

Figure 14C:
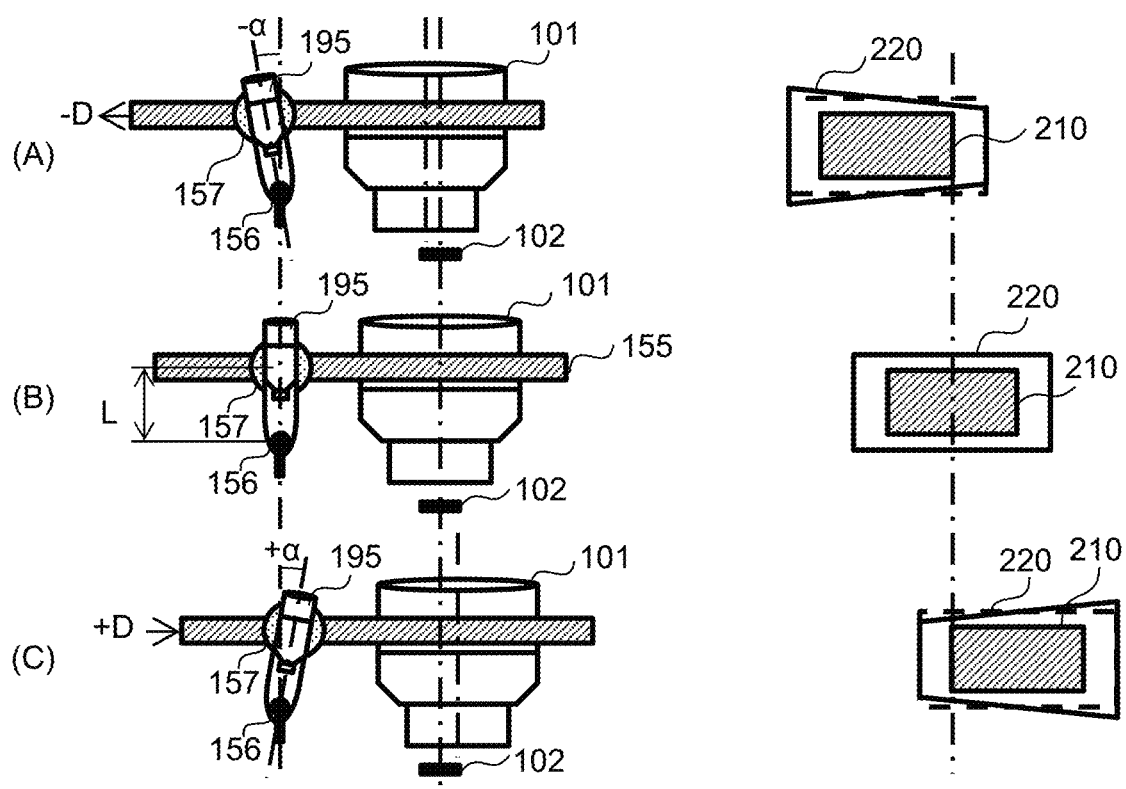
FIG. 14C is a view describing a configuration in which when the projection lens is a zoom lens, the imaging lens is also a zoom lens and a lens shift is performed in a state where a shift of the position of an optical axis of the projection lens and a conversion of an angle of an optical axis of an imaging camera are in conjunction with each other in the second embodiment.

Therefore, as in FIG. 14C, the imaging lens may also be a zoom lens, and the zooming of the imaging lens may be adjusted according to the zooming of the projection lens. In FIG. 14C, the same configurations as those in FIG. 14B are denoted by the same reference signs, and a description thereof will be omitted. FIG. 14C illustrates an example in which the zooming of the projection lens is in a state of the telephoto side end and the zooming of the imaging lens is also in a state of the telephoto side end. Accordingly, the effective resolution efficiency of the imaging sensor is more improved than in the example of FIG. 14B, and is the same as that in the example of FIG. 14A.

Incidentally, similarly to the zooming of the projection lens, the zooming of the imaging lens may be performed manually or automatically. In the automatic zooming, the zooming of the imaging lens may be controlled in conjunction with the zooming of the projection lens. In the manual zooming, a user or an installer may manually adjust the zooming to an appropriate position.

In the examples of FIGS. 14A to 14C, in order to simplify description, an example has been described in which only a lens shift of the projection lens in the horizontal direction and the changing of the angle of the optical axis of the imaging lens in the horizontal direction are performed; however, the concept of the examples of FIGS. 14A to 14C can also be applied to a case where a lens shift of the projection lens in the vertical direction and the changing of the angle of the optical axis of the imaging lens in the vertical direction are performed, and to a case where a lens shift of the projection lens and the changing of the angle of the optical axis of the projection lens in two directions, specifically, the horizontal direction and the vertical direction are performed.

The configuration examples of FIGS. 14A to 14C can be adopted in the configuration in which the projection lens and the camera unit are configured as an integrated lens unit and are attached and detached by way of a lens unit, among the configurations described with reference to FIG. 8. Namely, the slider and various mechanisms for the lens shift function described with reference to FIGS. 14A to 14C may be included in the lens unit illustrated in FIG. 8.

Incidentally, in the embodiments of the present invention described above, when the imaging sensor for the interactive function is used, an influence of the resolution efficiency of the imaging sensor has been mentioned. According to this description, when an imaging sensor for the interactive function is used as the imaging sensor, it is more preferable that the resolution efficiency of the imaging sensor is high. The influence of the resolution efficiency of the imaging sensor is not limited to an interactive function application of the imaging sensor, and even when the imaging sensor is used for a focus adjustment application, it is more preferable that the resolution efficiency of the imaging sensor is high. Namely, in the embodiments of the present invention described above, an example in which the resolution efficiency of the imaging sensor is further increased is more preferable even when the imaging sensor for a focus adjustment application is used.

The embodiments have been described above; however, the present invention is not limited to the above embodiments and includes various modification examples. In addition, the above embodiments have been described in detail for easy understanding of the present invention, and the present invention is not necessarily limited to including all the configurations described. In addition, a part of a configuration of an embodiment can be replaced with a configuration of another embodiment, and a configuration of another embodiment can be added to a configuration of an embodiment. In addition, other configurations can be added to, removed from, or replaced with a part of the configuration of each of the embodiments.

REFERENCE SIGNS LIST

11 Central axis of display element
12 Optical axis of projection lens
100 Projection type image display apparatus
101 Projection optical system (projection lens)
102 Display element
123 Camera unit
124, 125 Lens unit
150, 151, 152, 153, 155 Slider
154 Transmission gear
156 Fulcrum
157 Connection portion
191 Imaging lens
192 Imaging sensor
193 Imaging lens identification unit
194 Projection lens identification unit
195 Imaging camera
197 IC
198 Switch
200 Display surface (screen)
201 Long focal length lens
202 Long focal length imaging lens
210 Projection range
220 Imaging range
291 Projection lens mounting portion
292 Imaging lens mounting portion (camera unit connection portion)
293 Lens unit mounting portion
301 Middle focal length lens
302 Middle focal length imaging lens
401 Ultra-short focal length lens
402 Ultra-short focal length imaging lens

The invention claimed is:
1. A projection type image display apparatus comprising:
a light source;
a lighting optical system configured to guide light from the light source to a display element;

a projection lens mounting portion in which a projection lens configured to project the light transmitting through or being reflected by the display element is mountable, and that is configured to allow one replaceable projection lens of a plurality of replaceable projection lenses to be selectively mounted in the projection type image display apparatus;

an imaging lens mounting portion configured to allow one imaging lens of a plurality of replaceable imaging lenses to be selectively mounted in the projection type image display apparatus;

an imaging lens identification circuit configured to identify the imaging lens mounted in the imaging lens mounting portion; and a projection lens identification circuit configured to identify the projection lens mounted in the projection lens mounting portion, wherein whether or not a warning is to be displayed in an image to be projected via the projection lens is determined according to a combination of the imaging lens identified by the imaging lens identification circuit and the projection lens identified by the projection lens identification circuit, the warning being related to a combination of the imaging lens mounted in the imaging lens mounting portion and the projection lens mounted in the projection lens mounting portion.

2. A projection type image display apparatus comprising:
a light source;
a lighting optical system configured to guide light from the light source to a display element;
a projection lens mounting portion in which a projection lens configured to project the light transmitting through or being reflected by the display element is mountable, and that is configured to allow one replaceable projection lens of a plurality of replaceable projection lenses to be selectively mounted in the projection type image display apparatus; and an imaging lens mounting portion configured to allow one imaging lens of a plurality of replaceable imaging lenses to be selectively mounted in the projection type image display apparatus;

an imaging lens identification circuit configured to identify the imaging lens mounted in the imaging lens mounting portion; and a projection lens identification circuit configured to identify the projection lens mounted in the projection lens mounting portion, wherein whether or not some operations of the projection type image display apparatus is to be limited is determined according to a combination of the imaging lens identified by the imaging lens identification circuit and the projection lens identified by the projection lens identification circuit.

3. A projection type image display apparatus comprising:
a light source;
a lighting optical system configured to guide light from the light source to a display element;
a projection lens mounting portion in which a projection lens configured to project the light transmitting through or being reflected by the display element is mountable, and that is configured to allow one replaceable projection lens of a plurality of replaceable projection lenses to be selectively mounted in the projection type image display apparatus; and an imaging lens mounting portion configured to allow one imaging lens of a plurality of replaceable imaging lenses to be selectively mounted in the projection type image display apparatus, wherein an autofocus process of the projection lens is performed based on an image captured via the imaging lens connected to the imaging lens mounting portion.

4. A projection type image display apparatus comprising:
a light source;
a lighting optical system configured to guide light from the light source to a display element;
a projection lens mounting portion in which a projection lens configured to project the light transmitting through or being reflected by the display element is mountable, and that is configured to allow one replaceable projection lens of a plurality of replaceable projection lenses to be selectively mounted in the projection type image display apparatus; and an imaging lens mounting portion configured to allow one imaging lens of a plurality of replaceable imaging lenses to be selectively mounted in the projection type image display apparatus, wherein an image of projection images to be projected by a plurality of the projection type image display apparatuses is captured via the imaging lens connected to the imaging lens mounting portion, and automatic overlay adjustment control of the projection images of the plurality of projection type image display apparatuses is performed based on the captured image.

5. A projection type image display apparatus comprising:
a light source;
a lighting optical system configured to guide light from the light source to a display element;
a projection lens mounting portion in which a projection lens configured to project the light transmitting through or being reflected by the display element is mountable, and that is configured to allow one replaceable projection lens of a plurality of replaceable projection lenses to be selectively mounted in the projection type image display apparatus; and a camera mounting portion configured to allow one camera of a plurality of replaceable cameras to be selectively mounted in the projection type image display apparatus.

6. The projection type image display apparatus according to claim 5,
wherein the camera to be mounted in the camera mounting portion includes an imaging lens and an imaging sensor.

7. The projection type image display apparatus according to claim 5, further comprising:
a camera identification circuit configured to identify the camera mounted in the camera mounting portion,
wherein a setting of a brightness correction, a color correction, and/or a geometric correction of an image to be captured via the camera is changed according to an identification result of the camera identification circuit.

8. The projection type image display apparatus according to claim 5, further comprising:
a camera identification circuit configured to identify the camera mounted in the camera mounting portion,
wherein the camera identification circuit identifies the camera mounted in the camera mounting portion, based on communication with the camera, a switch of a contact point between the camera and the camera mounting portion, or an electrical characteristic of a connection portion of the camera.

9. The projection type image display apparatus according to claim 5, further comprising:
  a camera identification circuit configured to identify the camera mounted in the camera mounting portion; and
  a projection lens identification circuit configured to identify the projection lens mounted in the projection lens mounting portion,
  wherein whether or not a warning is to be displayed in an image to be projected via the projection lens is determined according to a combination of the camera identified by the camera identification circuit and the projection lens identified by the projection lens identification circuit, the warning being related to a combination of the camera mounted in the camera mounting portion and the projection lens mounted in the projection lens mounting portion.

10. The projection type image display apparatus according to claim 5, further comprising:
  a camera identification circuit configured to identify the camera mounted in the camera mounting portion; and
  a projection lens identification circuit configured to identify the projection lens mounted in the projection lens mounting portion,
  wherein whether or not some operations of the projection type image display apparatus is to be limited is determined according to a combination of the camera identified by the camera identification circuit and the projection lens identified by the projection lens identification circuit.

11. The projection type image display apparatus according to claim 5,
  wherein an autofocus process of the projection lens is performed based on an image captured via the camera connected to the camera mounting portion.

12. The projection type image display apparatus according to claim 5,
  wherein a pointing position indicated by a user is identified based on an image captured via the camera connected to the camera mounting portion, and a content of a projection image to be projected by the projection lens is changed based on the pointing position.

13. The projection type image display apparatus according to claim 5,
  wherein an image of projection images to be projected by a plurality of the projection type image display apparatuses is captured via the camera connected to the camera mounting portion, and automatic overlay adjustment control of the projection images of the plurality of projection type image display apparatuses is performed based on the captured image.

14. A projection type image display apparatus comprising:
  a light source;
  a lighting optical system configured to guide light from the light source to an image display element; and
  a lens unit mounting portion in which a lens unit is mountable and that is configured to allow one replaceable lens unit of a plurality of replaceable lens units to be selectively mounted in the projection type image display apparatus, the lens unit including a projection lens configured to project the light transmitting through or being reflected by the image display element, and an imaging lens configured to capture an image of an outside of the projection type image display apparatus,
  wherein the lens unit to be mounted in the lens unit mounting portion includes an imaging sensor corresponding to the imaging lens.

15. A projection type image display apparatus comprising:
  a light source;
  a lighting optical system configured to guide light from the light source to an image display element; and
  a lens unit mounting portion in which a lens unit is mountable and that is configured to allow one replaceable lens unit of a plurality of replaceable lens units to be selectively mounted in the projection type image display apparatus, the lens unit including a projection lens configured to project the light transmitting through or being reflected by the image display element, and an imaging lens configured to capture an image of an outside of the projection type image display apparatus,
  wherein an imaging sensor corresponding to the imaging lens of the lens unit to be mounted in the lens unit mounting portion is provided not on a lens unit side but on a projection type image display apparatus side.

16. A projection type image display apparatus comprising:
  a light source;
  a lighting optical system configured to guide light from the light source to an image display element; and
  a lens unit mounting portion in which a lens unit is mountable and that is configured to allow one replaceable lens unit of a plurality of replaceable lens units to be selectively mounted in the projection type image display apparatus, the lens unit including a projection lens configured to project the light transmitting through or being reflected by the image display element, and an imaging lens configured to capture an image of an outside of the projection type image display apparatus,
  wherein the lens unit to be mounted in the lens unit mounting portion includes a position variable mechanism configured to displace the projection lens in a direction perpendicular to an optical axis of the projection lens, and to change a relative position between an imaging sensor and the imaging lens in conjunction with a displacement of the projection lens, the imaging sensor receiving the light passing through the imaging lens.

17. The projection type image display apparatus according to claim 16,
  wherein a change amount by which the relative position is changed by the position variable mechanism is equal to a displacement amount of the projection lens.

18. The projection type image display apparatus according to claim 16,
  wherein a change amount by which the relative position is changed by the position variable mechanism is proportional to a displacement amount of the projection lens and is smaller than the displacement amount of the projection lens.

19. A projection type image display apparatus comprising:
  a light source;
  a lighting optical system configured to guide light from the light source to an image display element; and
  a lens unit mounting portion in which a lens unit is mountable and that is configured to allow one replaceable lens unit of a plurality of replaceable lens units to be selectively mounted in the projection type image display apparatus, the lens unit including a projection lens configured to project the light transmitting through or being reflected by the image display element, and an imaging lens configured to capture an image of an outside of the projection type image display apparatus,
  the lens unit to be mounted in the lens unit mounting portion includes a mechanism that is configured to displace the projection lens in a direction perpendicular to an optical axis of the projection lens, and by which an angle of an optical axis of the imaging lens is variable in conjunction with a displacement of the projection lens.

20. A projection type image display apparatus comprising:
a light source;
a lighting optical system configured to guide light from the light source to an image display element; and
a lens unit mounting portion in which a lens unit is mountable and that is configured to allow one replaceable lens unit of a plurality of replaceable lens units to be selectively mounted in the projection type image display apparatus, the lens unit including a projection lens configured to project the light transmitting through or being reflected by the image display element, and an imaging lens configured to capture an image of an outside of the projection type image display apparatus,
wherein an autofocus process of the projection lens is performed based on an image captured via the imaging lens of the lens unit connected to the lens unit mounting portion.

21. A projection type image display apparatus comprising:
a light source;
a lighting optical system configured to guide light from the light source to an image display element; and
a lens unit mounting portion in which a lens unit is mountable and that is configured to allow one replaceable lens unit of a plurality of replaceable lens units to be selectively mounted in the projection type image display apparatus, the lens unit including a projection lens configured to project the light transmitting through or being reflected by the image display element, and an imaging lens configured to capture an image of an outside of the projection type image display apparatus,
wherein an image of projection images to be projected by a plurality of the projection type image display apparatuses is captured via the imaging lens of the lens unit connected to the lens unit mounting portion, and automatic overlay adjustment control of the projection images of the plurality of projection type image display apparatuses is performed based on the captured image.

* * * * *